(12) United States Patent
Oishi et al.

(10) Patent No.: US 7,064,292 B1
(45) Date of Patent: Jun. 20, 2006

(54) GRIP HEATER CONTROL APPARATUS

(75) Inventors: Yasuo Oishi, Niiza (JP); Katsuya Okamoto, Tokyo (JP)

(73) Assignees: Honda Access Corp., Saitma (JP); Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 11/237,694

(22) Filed: Sep. 29, 2005

(30) Foreign Application Priority Data

Apr. 1, 2005 (JP) ............................. 2005-106276
Apr. 1, 2005 (JP) ............................. 2005-106277

(51) Int. Cl.
*H05B 1/02* (2006.01)

(52) U.S. Cl. ...................... 219/204; 219/202; 219/506

(58) Field of Classification Search ................ 219/204, 219/202, 494, 497, 504, 506, 530, 540, 544; 74/551.9, 558.5, 557
See application file for complete search history.

(56) References Cited

U.S. PATENT DOCUMENTS 6,844,524 B1 * 1/2005 Downey et al. ............ 219/204
6,903,312 B1 * 6/2005 Miura et al. ................ 219/506
6,927,367 B1 * 8/2005 Livingstone ................ 219/490
6,984,807 B1 * 1/2006 Richlen ...................... 219/204

FOREIGN PATENT DOCUMENTS

EP        1555198 A1 *   7/2005
JP       2004-67075       3/2004

* cited by examiner

*Primary Examiner*—John A. Jeffery
*Assistant Examiner*—Vinod Patel
(74) *Attorney, Agent, or Firm*—Westerman, Hattori, Daniels & Adrian, LLP.

(57) ABSTRACT

A grip heater control apparatus enabling a driver to visually identifying the electrified condition of a heater and to control the temperature of the heater easily during vehicle driving and enabling the configuration for the temperature control and the visual identification to be space-saving. A single light emitter (4) is provided as an indicator along with heater temperature operators (5, 6) at an end of a grip (1). The indication control unit includes a unit for executing an operating state indication control process including a process of variably setting a first predetermined cycle, which is a blinking cycle of the light emitter (4), according to target electric energy set by a target electric energy setting unit in response to an operation of the heater temperature operator (5, 6) when operated and a process of blinking the light emitter (4) in the set first predetermined cycle.

20 Claims, 17 Drawing Sheets

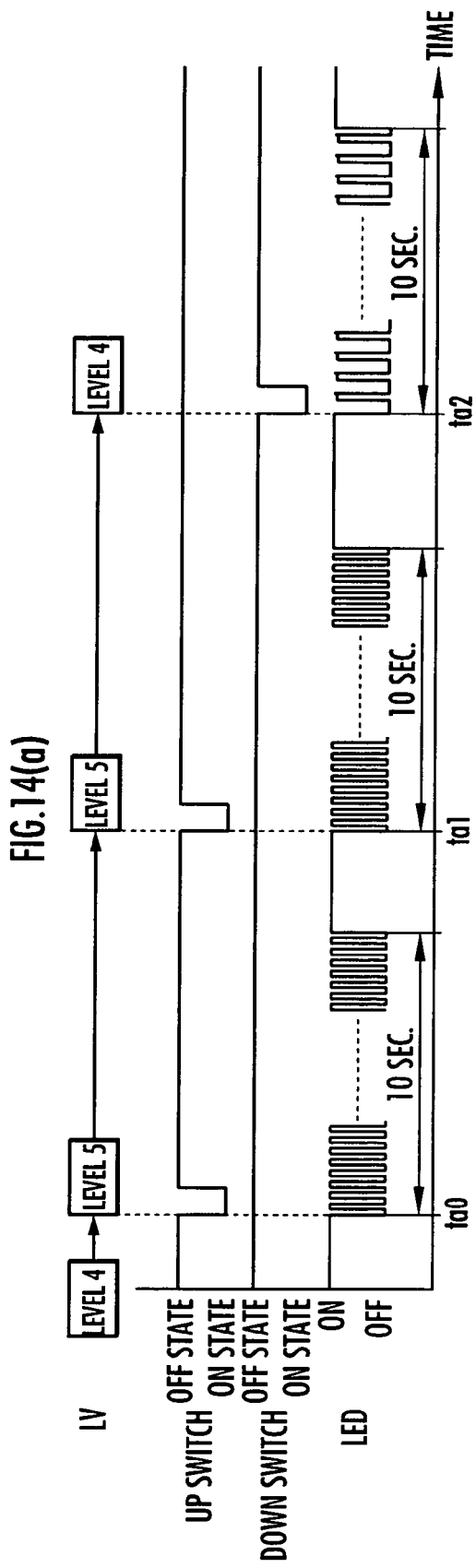
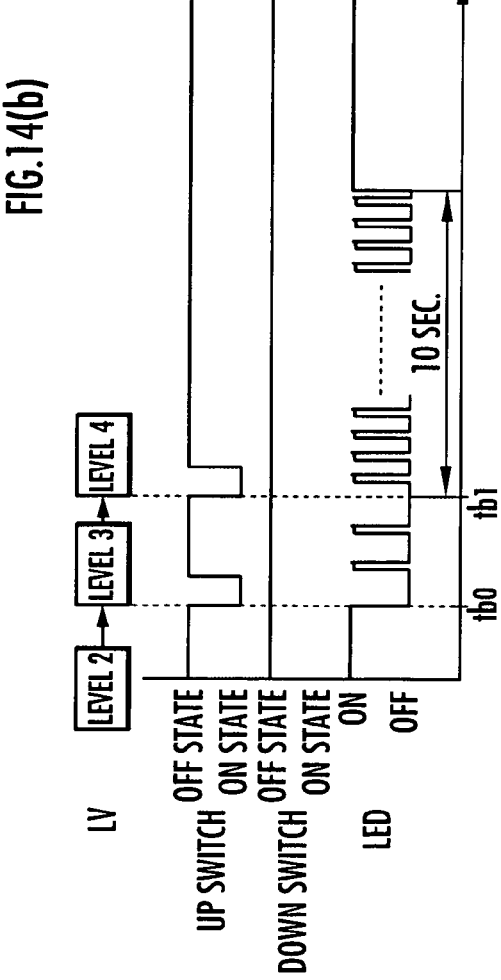

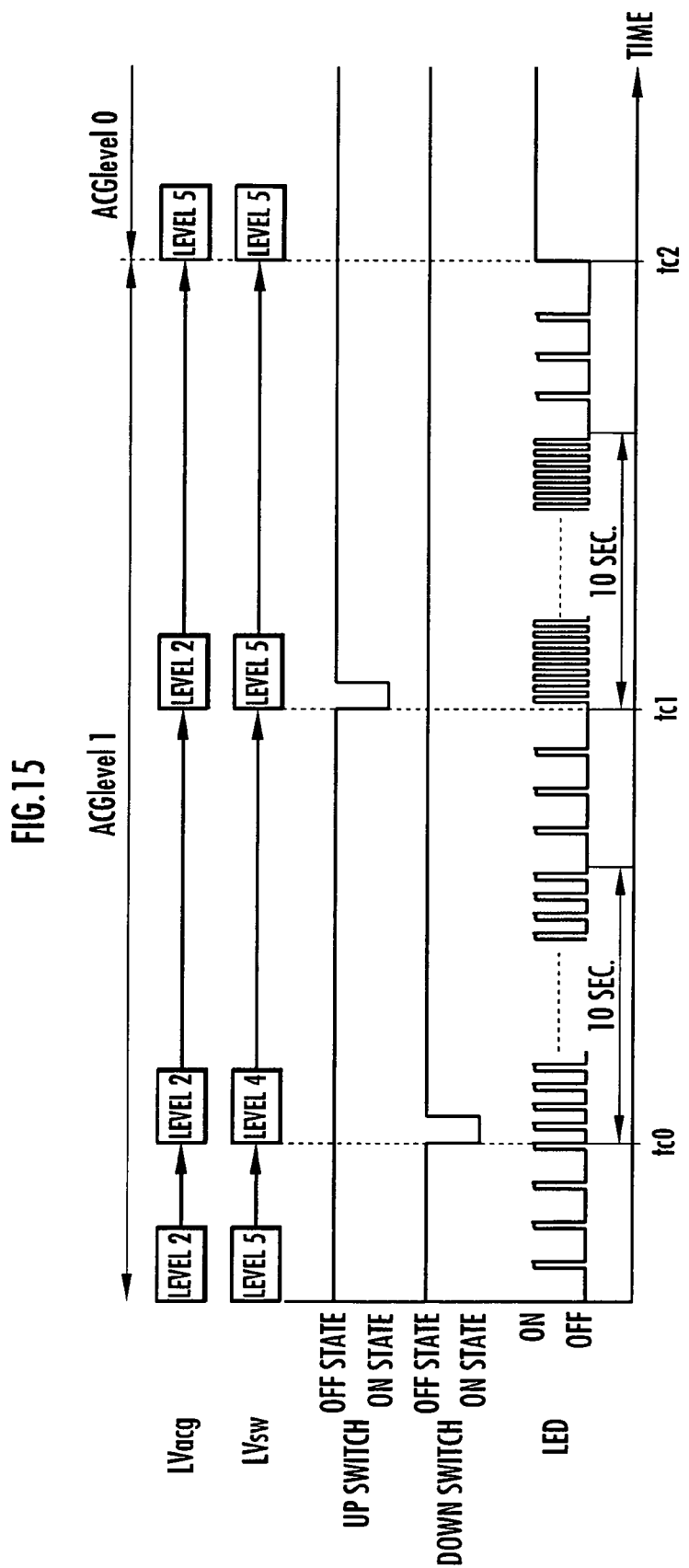

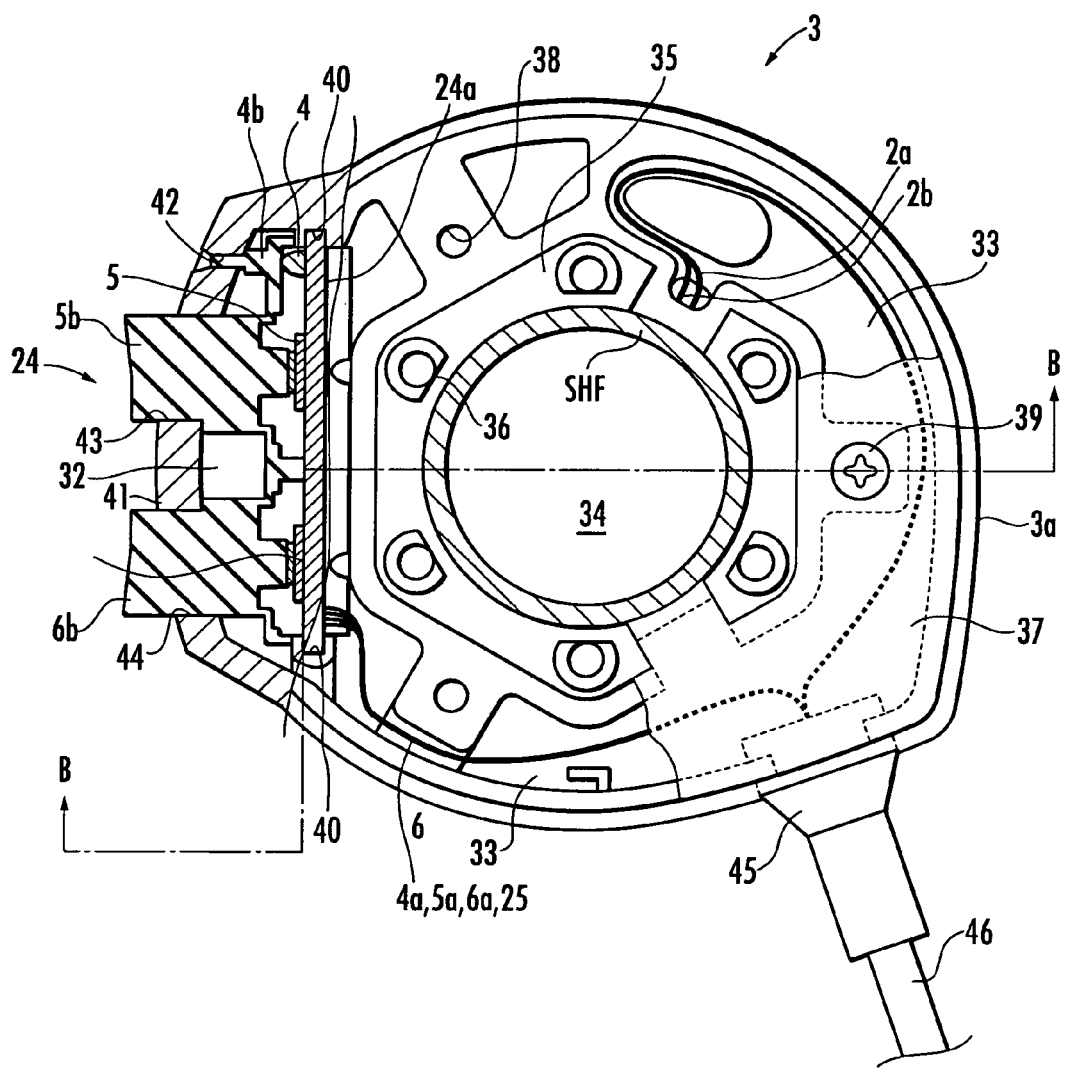

GRIP HEATER CONTROL APPARATUS

BACKGROUND OF THE INVENTION

1. Field of the Invention

The present invention relates to a control apparatus for a heater provided in a grip of a steering handle of a vehicle such as a motorcycle, a snowmobile, or a wet bike.

2. Related Background Art

Conventionally, there is an already known technology of providing a comfortable driving environment for a driver by providing a heater (an electric heater) in a grip (a part gripped by the driver) of a steering handle and controlling the electric energy supplied to the heater to warm the grip in a vehicle having an engine (including an internal combustion engine) as a propulsive source such as a motorcycle, a snowmobile, and a wet bike (for example, refer to Japanese Laid-Open Patent Publication No. 2004-67075 (hereinafter, referred to as patent document 1)).

In the grip heater control apparatus in this patent document 1, a switch unit is provided integrally with a controller for controlling the electric energy supplied to the heater in a cowling attached to the left side surface of the vehicle body. The switch unit is provided with an up switch and a down switch for increasing or decreasing a temperature of the heater with a driver's operation and four light emitting diodes for use in making a driver recognize the electrified condition of the heater by the number of lit light emitting diodes. Upon receiving operation outputs of the up switch and the down switch, the controller determines the number of lit light emitting diodes based on the number of ON times of the up switch and the number of ON times of the down switch. Then, the electricity to the heater is controlled by the PWM control on the basis of a duty factor to the heater (target electric energy to the heater) determined according to the number of lit light emitting diodes. Herewith, the controller supplies electricity to the corresponding number of light emitting diodes on the basis of the number of lit light emitting diodes, by which an electric current flows from the anode side of the light emitting diodes and thereby the light emitting diodes are turned on. At this point, the target electric energy to the heater specified by the operation of the up switch and the down switch can be visually identified by the number of lit light emitting diodes.

Meanwhile, a driver sometimes adjusts a temperature of the heater while checking the electrified condition of the heater during vehicle driving. Therefore, preferably the grip heater control apparatus enables the driver readily to control the temperature of the heater or to visually identify the electrified condition of the heater. Thereby, it is thought to be preferable to have a switch for controlling the temperature of the heater or an indicator for use in visually identifying the electrified condition of the heater in a place such as around a grip, for example. Around the grip, however, there is generally a need for installing required devices for the vehicle running such as a meter, a lamp switch, and the like, thus limiting the space for installing the switch or the indicator related to the grip heater control apparatus.

The grip heater control apparatus in the patent document 1 uses a plurality of light emitting diodes. Moreover, the switch unit is integral with the controller. Thereby, a wide space is needed to install the switch unit. Therefore, it is hard to install the switch unit in the limited space around the grip and thereby the switch unit has been mounted on the cowling attached to the left side surface of the vehicle in the grip heater control apparatus in the patent document 1.

SUMMARY OF THE INVENTION

It is therefore an object of the present invention to provide a grip heater control apparatus enabling a driver to visually identifying the electrified condition of the heater and to control the temperature of the heater easily during vehicle driving and enabling the configuration for the temperature control and the visual identification to be space-saving by resolving these disadvantages.

To achieve the above object, according to one aspect of the present invention, there is provided a grip heater control apparatus, comprising: a heater for generating heat by means of electric power supplied from a battery, the heater being provided in a grip of a steering handle of a vehicle having the battery; a heater temperature operator operated by a driver for adjusting a temperature of the heater; an operation signal output unit for outputting a signal corresponding to an operation of the heater temperature operator; a target electric energy setting unit for setting target electric energy to the heater according to the output of the operation signal output unit; a heater control unit for controlling the electric energy supplied to the heater from the battery to the target electric energy under at least a predetermined condition; an indicator for indicating at least an electrified condition of the heater; and an indication control unit for controlling an indication of the indicator, wherein the indicator is a single light emitter provided along with the heater temperature operator at an end of the grip and wherein the indication control unit includes a unit for executing an operating state indication control process including a process of variably setting a first predetermined cycle, which is a blinking cycle of the light emitter, according to the target electric energy set by the target electric energy setting unit in response to an operation of the heater temperature operator when operated and a process of blinking the light emitter in the set first predetermined cycle.

According to this aspect of the present invention, only the single light emitter is used as the indicator for indicating the electrified condition of the heater, which results in space saving. Thus, the indicator can be easily installed at the end of the grip along with the heater temperature operator. Moreover, when the heater temperature operator is operated, the first predetermined cycle is variably set according to the target electric energy set by the target electric energy setting unit in response to the operation and the light emitter blinks at the set first predetermined cycle. Therefore, it is possible to make the driver clearly recognize the target electric energy to the heater set by the driver's operation by means of the indication of the single light emitter. Thereby, the driver can easily control the temperature of the heater while visually identifying the electrified condition of the heater (the electrified condition specified by the operation of the heater temperature operator) during driving. As the predetermined condition, for example, there is a condition that the target electric energy is not excessive relative to the amount of power generation of the generator due to the sufficiently high number of revolutions of the vehicle engine or generator.

Moreover, preferably the indication control unit executes a process of blinking the light emitter in the set first predetermined cycle for a predetermined period of time immediately after the heater temperature operator is operated in the operating state indication control process.

According thereto, the light emitter blinks at the set first predetermined cycle for the predetermined period of time immediately after the heater temperature operator is operated (for example, for a fixed time period), thereby enabling the driver to clearly recognize the target electric energy to the heater set by the driver's operation immediately after the operation and minimizing the blinking period of the light emitter.

In this regard, preferably the indication control unit sets the first predetermined cycle so as to be shorter in proportion as the target electric energy increases.

According thereto, the frequency of the light emitter blinking is higher (the cycle is shorter) in proportion as the target electric energy increases according to the degree of a change in the target electric energy to the heater, whereby the driver can readily get a sense of the magnitude of the target electric energy. Thereby, the driver can recognize the electrified condition of the heater more easily.

When the driver is to change the electric energy supplied to the heater in a short time or the like, the heater temperature operator may be operated multiple times during the predetermined period of time. Therefore, if the heater temperature operator is operated again during the predetermined period of time immediately after the heater temperature operator is operated, preferably the indication control unit aborts the operating state indication control process before the second operation and performs the operating state indication control process anew.

According thereto, if the heater temperature operator is operated again during the predetermined period of time immediately after the heater temperature operator is operated, the indication control unit aborts the operating state indication control process before the second operation and performs the operating state indication control process anew. Therefore, the indication corresponding to the latest operation of the heater operator is immediately performed, thereby enabling the driver to clearly recognize the target electric energy to the heater set anew.

Moreover, preferably the indication control unit includes a unit for executing a stationary state indication control process of causing the light emitter to stay on continuously if the heater control unit is controlling the electric energy supplied to the heater to the target electric energy in a period other than the predetermined period of time.

According thereto, if the heater control unit is controlling the electric energy supplied to the heater to the target electric energy in a period other than the predetermined period of time, the light emitter stays on continuously, thereby enabling the driver to clearly recognize that the heater is constantly electrified at the target electric energy set by the driver unless the operating state indication control process is performed.

Moreover, the vehicle has an engine as a propulsive source and a generator for generating electric power interlocking with the rotation of the engine and charging the battery. The grip heater control apparatus includes a revolutions detecting unit for detecting the number of revolutions of the engine or the generator and an upper limit electric energy setting unit for setting the upper limit electric energy to the heater according to the detected number of revolutions. If the heater control unit controls the electric energy supplied to the heater to a lower level of the target electric energy and the upper limit electric energy, preferably the unit for executing the stationary state indication control process blinks the light emitter in a second predetermined cycle for the period other than the predetermined period of time if the heater control unit is controlling the electric energy supplied to the heater to the upper limit electric energy in the period other than the predetermined period of time.

According thereto, the light emitter blinks in the second predetermined cycle if the heater control unit is controlling the electric energy supplied to the heater to the upper limit electric energy in the period other than the predetermined period of time, thereby enabling the driver to clearly recognize that an actual electric energy to the heater is limited to the upper limit electric energy. Preferably, the second predetermined cycle is set to the same value as for the first predetermined cycle set by the indication control unit when the upper limit electric energy is considered to be the target electric energy.

In this regard, if there are plural types of values for the upper limit electric energy set by the upper limit electric energy setting unit according to the detected number of revolutions, preferably the indication control unit sets the second predetermined cycle variably according to the value of the upper limit electric energy.

According thereto, the second predetermined cycle is variably set according to the value of the upper limit electric energy, thereby enabling the driver to clearly recognize the value of the upper limit electric energy when the actual electric energy to the heater is limited to the upper limit electric energy. The second predetermined cycle is preferably set so as to be shorter in proportion as the upper limit electric energy increases.

Moreover, preferably the target electric energy set by the target electric energy setting unit includes zero, the heater control unit includes a unit for halting the electricity to the heater if the target electric energy is zero, and the indication control unit includes a unit for inhibiting the operating state indication control process and the stationary state indication control process and executing an electricity halt indication control process that causes the light emitter to stay off continuously, if the electricity to the heater is halted by the heater control unit.

According thereto, if the target electric energy is set to 0 and the electricity to the heater is halted, the light emitter is turned off, thereby enabling the driver to clearly recognize that the heater is halted by the driver's operation.

In addition, the heater temperature operator may be abnormally operated when a circuit related to the heater temperature operator (the operation signal output unit) short-circuits or when the heater temperature operator is held down unintentionally by the driver. If that occurs, it is desirable to make the driver recognize immediately that the abnormality has occurred in the function of the heater temperature operator or in its operation. Therefore, preferably the grip heater control apparatus includes an operator abnormality detecting unit for detecting an abnormality in the heater temperature operator and the indication control unit includes a unit for inhibiting the operating state indication control process and the stationary state indication control process and executing an operator abnormality indication control process of blinking the light emitter in a third predetermined cycle, which is different from the first predetermined cycle, if the abnormality of the heater temperature operator is detected. Meanwhile, if the unit for executing the stationary state indication control process is to blink the light emitter in the second predetermined cycle when the heater control unit controls the electric energy supplied to the heater to the upper limit electric energy in the period other than the predetermined period of time, preferably the indication control unit includes a unit for inhibiting the operating state indication control process and the stationary state indication control process and executing an operator abnormality indication control process of blinking the light emitter in a third predetermined cycle, which is different from either of the first and second predetermined cycles, if the abnormality of the heater temperature operator is detected.

According thereto, if the abnormality in the heater temperature operator is detected, the operating state indication control process and the stationary state indication control process are inhibited and the operator abnormality indication control process is performed, thereby reliably indicating that the abnormality occurs in the function of the heater temperature operator or its operation. At that time, the light emitter is caused to blink at the third predetermined cycle, which is different from either of the first and second predetermined cycles. For example, the third predetermined cycle is longer than the first predetermined cycle (an arbitrary first predetermined cycle that can be set according to the target electric energy) and longer than the second predetermined cycle (an arbitrary second predetermined cycle that can be set according to the upper limit electric energy). This results in a different indication from those of the operating state indication control process and the stationary state indication control process, thereby enabling the driver to clearly recognize the abnormality in the heater temperature operator.

If a battery voltage drops below a predetermined voltage (for example, a voltage slightly higher than the minimum voltage required to start the engine (drive a starter motor)), it is possible to prevent the battery voltage from excessively dropping away by forcibly turning off the heater (halting electricity to the heater), for example. In this regard, it is desirable to make the driver recognize immediately that the battery voltage drops. Therefore, preferably the grip heater control apparatus includes a battery voltage detecting unit for detecting a voltage of the battery and, if the detected battery voltage is below a predetermined voltage, the indication control unit includes a unit for inhibiting the operating state indication control process and the stationary state indication control process and executing a voltage drop indication control process of causing the light emitter to stay on continuously with the light emitter dimmer than when it is on in the stationary state indication control process.

According thereto, if the voltage drop is detected, the operating state indication control process and the stationary state indication control process are inhibited and the voltage drop indication control process is performed, thereby reliably indicating that the battery voltage drops. At that time, the light emitter is caused to stay on continuously with the light emitter dimmer (with the brightness of the lit light emitter lower) than when it is on in the stationary state indication control process. This results in a different indication from those of the operating state indication control process and the stationary state indication control process, thereby enabling the driver to clearly recognize the drop in the battery voltage.

Moreover, in the grip heater control apparatus according to the present invention described above, the heater temperature operator preferably includes at least one on-off switch. The on-off switch is formed by, for example, an up switch of the pressing operation type for increasing a temperature of the heater and a down switch of the pressing operation type for decreasing a temperature of the heater. Alternatively, the on-off switch may be formed by a single on-off switch for changing the settings in stages between the halt of the heater and plural types of settings of the heater temperature every time the on-off switch is pressed.

According thereto, the heater temperature is controlled by the on-off switch operation, whereby the operation is easier than when using a dial for temperature control, for example, and thus the driver can easily control the heater temperature during vehicle driving.

Preferably, the grip heater control apparatus having the on-off switch includes a light emitting diode as the light emitter and a control circuit having at least functions of the operation signal output unit, the target electric energy setting unit, the heater control unit, and the indication control unit, wherein the on-off switch and the light emitting diode are packaged in a single assembly, which is separate from the control circuit, and placed at an end of the grip, wherein the control circuit is mounted on the vehicle in a place other than the steering handle of the vehicle, wherein one end of the on-off switch and the cathode side of the light emitting diode are grounded via a common ground wire connected to the assembly, wherein the other end of the on-off switch is connected to the control circuit via a switch connecting wire for connecting between the control circuit and the assembly to flow current from the control circuit to the on-off switch when turning on the on-off switch, and wherein the anode side of the light emitting diode is connected to the control circuit via a light emitting diode connecting wire for connecting between the control circuit and the assembly to flow current from the control circuit to the light emitting diode when turning on the light emitting diode. The on-off switch conducts across thereof in the ON state and the conduction across the on-off switch is electrically interrupted in the OFF state.

According thereto, the on-off switch and the light emitting diode are packaged in a single assembly, which is separate from the control circuit, and placed at the end of the grip, and the control circuit is mounted on the vehicle in a place other than the steering handle of the vehicle. The assembly separated from the control circuit in this manner reduces the space necessary for installing the switch and the light emitting diode and therefore they can be installed in a limited space around the grip.

Moreover, according to the present invention, one end of the on-off switch and the cathode side of the light emitting diode are grounded via the common ground wire connected to the assembly. Furthermore, the other end of the on-off switch is connected to the control circuit via the switch connecting wire for connecting between the control circuit and the assembly, whereby the current flows from the control circuit to the on-off switch in the ON state of the on-off switch. In the OFF state of the on-off switch, the current does not flow from the control circuit to the on-off switch. Therefore, it is possible to detect the ON state or the OFF state in the control circuit by determining whether the current is applied to the on-off switch. Still further, the anode side of the light emitting diode is connected to the control circuit via the light emitting diode connecting wire for connecting between the control circuit and the assembly, whereby the current for turning on the light emitting diode flows from the control circuit to the light emitting diode when the light emitting diode is turned on.

Therefore, only one connecting wire is needed each as an exclusive connecting wire to be connected to the assembly to detect the operation of the on-off switch or as an exclusive connecting wire to be connected to the assembly to drive the light emitting diode. This allows a reduction in the number of connecting wires to be connected to the assembly and downsizing of the assembly. Thus, the switch and the light emitting diode can be easily located at the end of the grip, whereby the driver can control the heater temperature while visually identifying the electrified condition of the heater during driving.

Preferably the assembly includes the on-off switch and the light emitting diode mounted on a printed circuit board with the switch connecting wire, the light emitting diode connecting wire, and the ground wire connected thereto, and the printed circuit board is housed in a casing fixed at the end of the grip with being externally fitted on the base of the steering handle.

In this regard, preferably the on-off switch is of the pressing operation type, a pressing operating section of the switch is provided in such a manner as to be exposed to the outside of the casing, the light emitting diode is provided inside the casing, and the casing is equipped with a light transmitting member for guiding a light emitted from the light emitting diode to the outside of the casing in a location where the light transmitting member faces the light emitting diode.

According thereto, the pressing operating section of the on-off switch is exposed to the outside of the casing, thereby enabling the switch operation easily, and the light emitting diode emits light to the outside of the casing via the light transmitting member, whereby the driver can easily identify the light emitting diode.

Moreover, preferably, the grip is provided at two places on the left hand side and on the right hand side on the steering handle with the heater incorporated in each grip, the on-off switch is operated to adjust a temperature of the heater in the grip provided at two places, the casing is provided at the end closer to the center of the vehicle of one of the grips at two places, a heater connecting wire connected to the heater for a supply of electricity to the heater of the grip, which is one of the grips, is led into the inside of the casing. The heater connecting wire is then bundled with the switch connecting wire, the light emitting diode connecting wire, and the ground wire connected to the printed circuit board in a single connection cable and is led out from the inside of the casing to the outside thereof.

According thereto, the heater connecting wire, the switch connecting wire, the light emitting diode connecting wire, and the ground wire are bundled in a single connection cable and are led to the outside of the casing, thereby simplifying the wiring so as to facilitate the installation. The connection cable is preferably sheathed with a waterproof sheathing, for example.

BRIEF DESCRIPTION OF THE DRAWINGS

The above object, features and advantages of the present invention will become apparent from the following detailed description when taken with the accompanying drawing in which:

FIG. 14 is a graph showing relations among a heater output level, switch operations, and an LED ON/OFF state in the grip heater control apparatus in FIG. 2;

FIG. 15 is a graph showing relations among a heater output level, switch operations, and an LED ON/OFF state under ACG level limiting operation in the grip heater control apparatus in FIG. 2; and FIG. 16 is a cross section of the flange 3 of the left grip in FIG. 1 taken on line A—A in FIG. 1, as viewed in the direction indicated by the arrow (partly cutway view)

DETAILED DESCRIPTION OF THE PREFERRED EMBODIMENTS

The preferred embodiment of the present invention will now be described in detail hereinafter with reference to the accompanying drawings. In this embodiment, an autobicycle (motorcycle) is taken for example as a vehicle provided with a grip heater control apparatus, which is the embodiment of the present invention.

Figure 1:
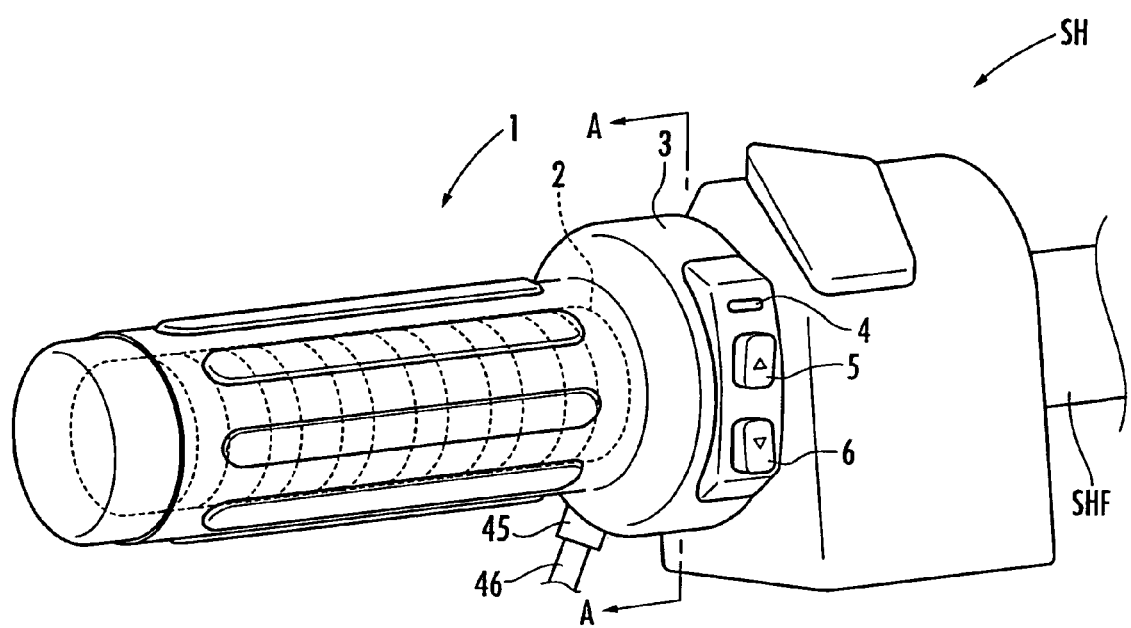
FIG. 1 is an overview diagram of a left grip of a vehicle provided with a grip heater control apparatus according to an embodiment of the present invention.

First, referring to FIG. 1, there is shown the grip heater control apparatus according to the embodiment for controlling the electric energy to a heater (electric heater) 2 made of a flexible printed-wiring board or the like incorporated in each of a left grip 1 and a right grip not shown, each of which is provided in a steering handle SH of the motorcycle. The left grip 1 and the right grip are made of rubber or other resin each in the form of a cylinder with a bottom and inserted around each end (the left end and the right end) of a frame SHF (a base of a steering handle of the present invention) of the steering handle SH, respectively. The heater 2 for the left grip 1 is placed between the internal perimeter surface of the grip 1 and the peripheral surface of the frame SHF of the steering handle SH and the heater 2 warms the left grip 1 by means of heat generation. While not shown, the heater for the right grip is arranged similarly to the heater 2. In the following description, the heater for the right grip bears a reference numeral 2, too.

Moreover, a flange 3 formed at the right end (the end closer to the center of the motorcycle) of the left grip 1 is provided with an LED 4 (an indicator or a light emitting diode of the present invention) for notifying the driver of the conditions of electricity supplied to the heaters 2, 2 by indicating the conditions and provided with an up switch 5 and a down switch 6 (an on-off switch of the present invention) as heater temperature operators operated by the driver to adjust the temperatures of the heaters 2, 2 (more accurately, to set the electric energy to the heaters 2, 2). The up switch 5 is of the pressing operation type where the switch is operated to increase the temperatures (the electric energy) of the heaters 2, 2 or to start the power supply to the heaters 2, 2. The down switch 6 is of the pressing operation type where the switch is operated to decrease the temperatures (the electric energy) of the heaters 2, 2 or to halt the power supply to the heaters 2, 2. The flange 3 is provided with a rubber boot 45 and a connection cable 46 described later.

Subsequently, with reference to FIG. 2, there is shown the grip heater control apparatus 7 in this embodiment comprising a controller 8 (a control circuit of the present invention) made of an electronic circuit and the like, the heaters 2, 2, the LED 4, the up switch 5, and the down switch 6. The grip heater control apparatus 7 is mounted on the motorcycle and is connected to a generator 9 for generating electric power interlocking with the revolutions of an engine not shown and to a battery 10 charged by the generator 9. The engine is a propulsive source of the motorcycle.

The generator 9 is, for example, a three phase AC generator (ACG) with its rotor connected to an output shaft of the engine so as to rotate interlocking with the rotation of the output shaft of the engine. The amount of power generation of the generator 9 decreases in proportion as the number of engine revolutions (the rotational speed of the output shaft) is lower. Moreover, the rotor of the generator 9 is connected to a pickup rotor 29, which is a metal plate having nine pawl projections 29a in the periphery, coaxially with the rotor. In the vicinity of the pickup rotor 29, there is provided a pickup coil 30 for outputting a pickup signal corresponding to the rotation of the pickup rotor 29. The pickup coil 30 sequentially faces respective projections 29a during rotation of the pickup rotor 29 and outputs a pickup signal in the form of a pulse each time. Thereby, the pickup signal corresponding to the number of revolutions of the generator 9 (the rotational speed of the rotor) is output and it is input to the controller 8.

Figure 3:
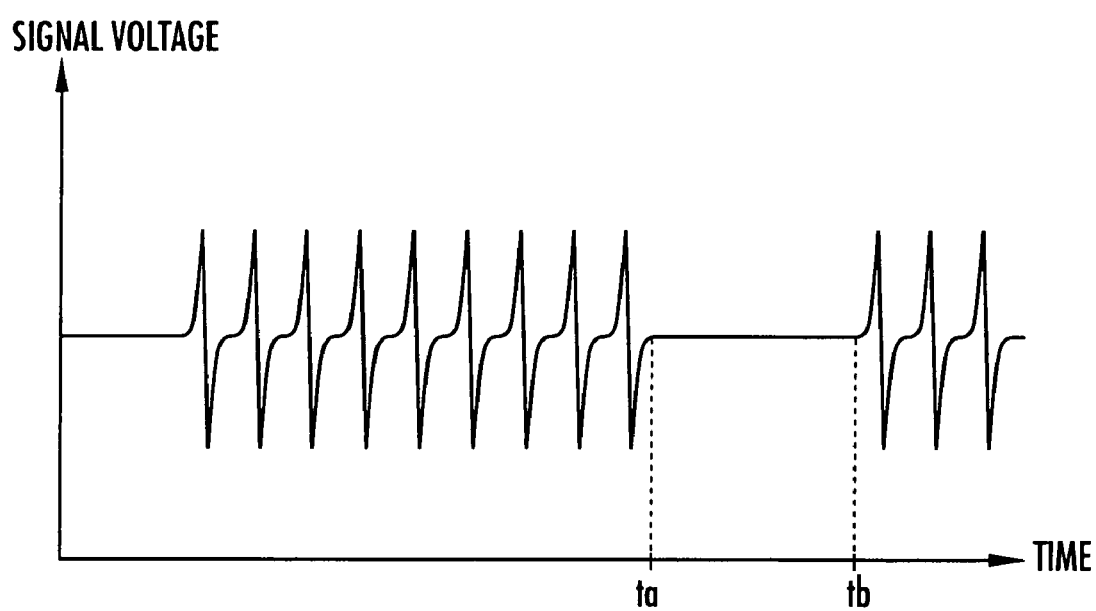
FIG. 3 is a graph showing an hourly variation of a pickup signal in the grip heater control apparatus shown in FIG. 2.

Referring to FIG. 3, there is shown a graph illustrating an hourly variation of the pickup signal output from the generator 9 to the controller 8, having an axis of ordinate representing signal voltage and an axis of abscissa representing time. The pickup signal indicates a waveform having a cycle corresponding to the number of revolutions of the generator 9, where the cycle becomes shorter in proportion as the number of revolutions of the generator 9 increases. In the generator 9 of this embodiment, the projections 29a of the pickup rotor 29 are not arranged at regular intervals on the perimeter of the rotor 29. Therefore, even if the rotor of the generator 9 is continuously rotating, there appears a period in which no pickup signal is output periodically like the period ta to tb in FIG. 3.

The battery 10 is, for example, a lead battery and for use in supplying power to the entire electric system of the motorcycle. The battery 10 has a negative electrode 10a and a positive electrode 10b connected to the generator 9 via a rectifier circuit 31 and is charged by a DC voltage provided by rectifying the voltage of generated power of the generator 9 using the rectifier circuit 31. In this regard, the rectifier circuit 31 is, for example, a full-wave rectifier circuit or a half-wave rectifier circuit. The battery 10 has a negative electrode 10a connected to ground and a positive electrode 10b connected in series with a main switch 11 and a fuse 12 of the motorcycle and is connected to the controller 8 in such a way as to supply an output voltage of the battery 10 to the controller 8 via the main switch 11 and the fuse 12.

Moreover, the battery 10 is connected to the heaters 2, 2 in such a way as to supply electricity to the heaters 2, 2 via the main switch 11 and the fuse 12. For more detail, the heaters 2, 2 are connected in series, with one end of the series circuit is connected to the positive electrode 10b of the battery 10 via the main switch 11 and the fuse 12 and the other end of the series circuit is connected to the controller 8. In this condition, the other end of the series circuit of the heaters 2, 2 is connected to ground or released by a heater output I/F 20 described later in the controller 8 and the battery 10 supplies electricity to the series circuit of the heaters 2, 2 when it is connected to ground.

The controller 8 is housed in, for example, a housing (not shown) of a head lamp of the motorcycle and comprises a CPU 13 for performing a control operation, a clock generating section 14 for generating a clock signal to the CPU 13, and an external reset circuit 15 for initializing the CPU 13. The controller 8 further comprises a power supply input section 16 supplied with an output voltage of the battery 10 (hereinafter, referred to as a battery voltage), a 5V power supply section 17 for generating and outputting a constant voltage Vdd of 5V from the output voltage of the power input section 16, and a power supply voltage dividing section 18 for outputting divided voltage Vs provided by dividing the output voltage of the power input section 16. The housing of the head lamp is attached to the steering handle SH so as to be integrally movable therewith when the steering handle SH is operated.

The controller 8 still further comprises an ACG signal input I/F 19 for receiving the pickup signal output from the generator 9 and outputting a pulse signal in synchronization with the pickup signal to the CPU 13 and a heater output I/F 20 for controlling the supply of electricity to the heater 2 from the battery 10 and its interruption according to an instruction of the CPU 13 to control the electric energy to the heater 2 (PWM control). The electric energy to the heater 2 can be set in six stages of level 0 to level 5 according to the operations of the up switch 5 and the down switch 6. At the level 0, the heater 2 is in the OFF state (the de-energized condition of the heater 2). The electric energy to the heater 2 is larger in proportion as the level is higher. In the present specification, "I/F" means an interface circuit.

Moreover, the controller 8 further comprises an LED output I/F 21 for turning on or off the LED 4 according to the output (operating instruction signal) from the CPU 13, an up switch input I/F 22 for generating a signal according to an operation of the up switch 5 and outputting it to the CPU 13, and a down switch input I/F 23 for generating a signal according to an operation of the down switch 6 and outputting it to the CPU 13.

Figure 4:
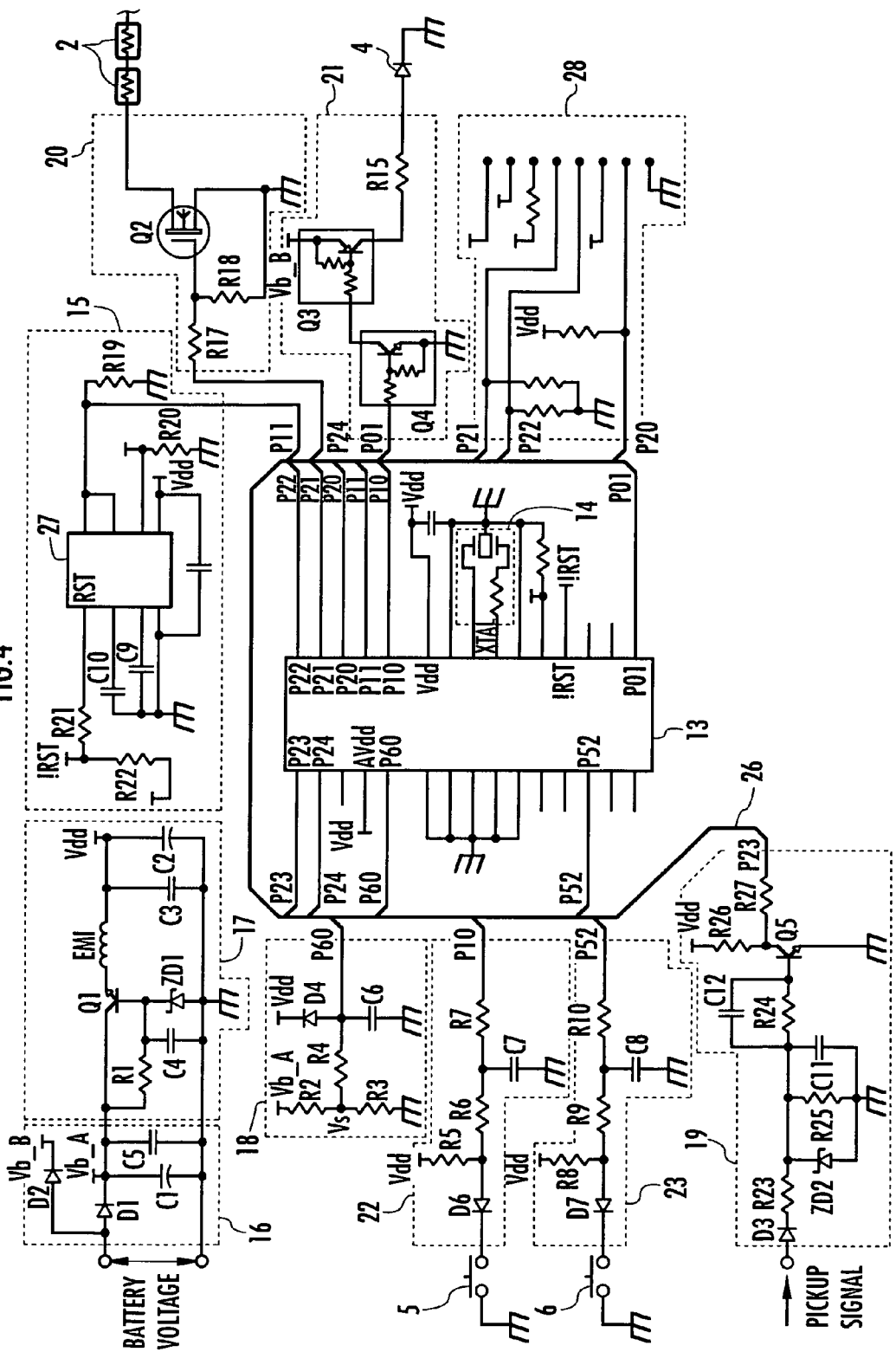
FIG. 4 is a circuit diagram of the grip heater control apparatus shown in FIG. 2.

The following sections provide a more detailed description of the controller 8 with reference to FIG. 4. The CPU 13 is connected to the external reset circuit 15, the power supply voltage dividing section 18, the ACG signal input I/F 19, the heater output I/F 20, the LED output I/F 21, the up switch input I/F 22, and the down switch input I/F 23 via a signal line group 26 formed by a plurality of bundled signal lines connected to terminals of the CPU 13, respectively. In FIG. 4, a reference numeral Pnm (n and m are integers) in the CPU 13 and a reference numeral Pnm written near the signal line group 26 indicate relations between the terminals of the CPU 13 and the circuits connected to the terminals via the signal line group 26. For example, "P23" indicates that the terminal P23 of the CPU 13 is connected to the ACG signal input I/F 19 via the signal line group 26.

The power supply input section 16 includes diodes D1, D2, an electrolytic capacitor C1, and a capacitor C5 connected as shown, a battery voltage (fluctuating due to the voltage of power generated by the generator 9) supplied from the battery 10 is supplied to charge the electrolytic capacitor C1 via the rectifier diode D1 and the charging battery voltage charged in the electrolytic capacitor C1 is supplied to the 5V power supply section 17 and the power supply voltage dividing section 18. The capacitor C5 is for use in removing noise components from the charging voltage of the electrolytic capacitor C1. The power supply input section 16 supplies the battery voltage, which is supplied from the battery 10, to the LED output I/F 21 via the diode D2. Hereinafter, a reference character Vb_A is appended to the battery voltage charged to the electrolytic capacitor C1 and a reference character Vb_B is appended to the battery voltage output from the diode D2. The reference characters Vb_A and Vb_B indicate almost equal voltages (for example, 12V), while Vb_A is more stable than Vb_B.

In this embodiment, the battery voltage (Vb_A) supplied to the 5V power supply section 17 and to the power supply voltage dividing section 18 is separated from the battery voltage (Vb_B) supplied to the LED output I/F 21 as two circuits via the diodes D1, D2, whereby the power supply voltage dividing section 18 is less affected by the battery voltage fluctuation caused by blinking of the LED 4 (ON or OFF of the LED 4).

The 5V power supply section 17 includes a transistor Q1, a resistor R1, a capacitor C4, a Zener diode ZD1, a coil for EMI (electromagnetic interference), a capacitor C3, and an electrolytic capacitor C2 connected as shown, basically generating a constant voltage Vdd of 5V from the battery voltage Vb_A supplied from the power supply input section 16 by means of a circuit composed of the transistor Q1, the Zener diode ZD1, and the resistor R1 and outputting and charging it to the electrolytic capacitor C2. The capacitor C4, the coil for EMI, and the capacitor C3 are for use in removing noise components from the constant voltage Vdd. The constant voltage Vdd is used as a power supply voltage for the CPU 13, the external reset circuit 15, the ACG signal input I/F 19, the up switch input I/F 22, and the down switch input I/F 23.

The power supply voltage dividing section 18 includes resistors R2, R3, and R4, a diode D4, and a capacitor C6 connected as shown, outputting a divided voltage Vs produced by dividing the battery voltage Vb_A input to the power supply input section 16 by the serially connected resistors R2 and R3 to an input terminal P60 of the CPU 13 via the resistor R4 and the signal line group 26. The divided voltage Vs is a voltage signal indicating the level of the battery voltage Vb_A. The capacitor C6 is for use in removing noise components from the divided voltage Vs. The diode D4 is for use in preventing the divided voltage Vs from exceeding the constant voltage Vdd, which is a power supply voltage of the CPU 13.

The ACG signal input I/F 19 includes a diode D3, a resistor R23, a Zener diode ZD2, resistors R25, R24, capacitors C11, C12, a transistor (switching transistor) Q5, and resistors R26, R27 connected as shown. The ACG signal input I/F 19 rectifies a pickup signal input from the generator 9 using the diode D3, further limiting the peak value of the rectified signal to 5V using the Zener diode ZD2, and then rectifying it into rectangular waves via a filter composed of the resistors R25, R24 and the capacitors C11, C12 before inputting the pickup signal to the base of the transistor Q5. The transistor Q5 has an emitter connected to ground and a collector to which a constant voltage Vdd is applied via the resistor R26 from the 5V power supply section 17. Therefore, the transistor Q5 is turned on or off in synchronization with the pickup signal, thereby generating a pulse signal in synchronization with the pickup signal at the collector of the transistor Q5. The pulse signal is a rectangular wave signal, which is set to 0V when the pickup signal is at a positive voltage and rises from 0V to Vdd (5V) when the pickup signal falls down from the positive voltage to the negative voltage. The pulse signal is output to the input terminal P23 of the CPU 13 via the resistor R27 and the signal line group 26.

The heater output I/F 20 includes a transistor (FET) Q2 and resistors R17, R18 connected as shown between the CPU 13 and the series circuit of the heaters 2, 2, turning on or off the transistor Q2 by means of a command signal (a high- or low-voltage signal) applied to a gate of the transistor Q2 from the terminal P21 of the CPU 13 via the signal line group 26 and the resistor R17. In this condition, the transistor Q2 is turned on during the period in which the command signal from the terminal P21 of the CPU 13 is at the high voltage (5V). At this moment, the battery 10 supplies electricity (the battery 10 supplies electric power) to the series circuit of the heaters 2, 2 connected to the drain of the transistor Q2. Meanwhile, the transistor Q2 is turned off during the period in which the command signal from the terminal P21 of the CPU 13 is at the low voltage (about 0V). At this moment, electricity supplied to the series circuit of the heaters 2, 2 is interrupted.

The LED output I/F 21 includes transistors (switching transistors) Q3, Q4 and a resistor R15 connected as shown between the CPU 13 and the LED 4, turning on or off the transistors Q3, Q4 by means of a command signal (a high- or low-voltage signal) applied to the base of the transistor Q4 via the signal line group 26 from a terminal P10 of the CPU 13. In this condition, the battery voltage Vb_B is applied to the emitter of the transistor Q3 from the power supply input section 16 and the LED 4 is connected to the collector of the transistor Q3 via the resistor R15. Then, the transistors Q3, Q4 are both turned on during the period in which the command signal from the terminal P10 of the CPU 13 is at the high voltage (5V). At this moment, the power supply input section 16 applies the battery voltage Vb_B to the LED 4 via the transistor Q3 and the resistor R15, whereby the LED 4 is energized and turned on. Meanwhile, the transistors Q3, Q4 are both turned off during the period in which the command signal from the terminal P10 of the CPU 13 is at the low voltage (0V), whereby the electricity supplied to the LED 4 is interrupted and turned off.

The up switch input I/F 22 includes a diode D6, resistors R5, R6, and a capacitor C7, and a resistor R7 connected as shown between the up switch 5 and the CPU 13. It outputs a charging voltage of the capacitor C7, which is charged by the constant voltage Vdd via the resistors R5, R6 from the 5V power supply section 17, to the CPU 13 via the resistor R7 and the signal line group 26 in the stationary state in which the up switch 5 is not pressed. When the up switch 5 is pressed, the capacitor C7 is grounded via the resistor R6, the diode D6, and the up switch 5. In this condition, if the up switch 5 is pressed and held for a predetermined period of time (for example, 0.5 msec), the charging voltage of the capacitor C7 drops from the constant voltage Vdd to the low voltage (approx. 0V). Then, the low voltage is output from the capacitor C7 to the CPU 13 via the resistor R7 and the signal line group 26 as a signal indicating that the up switch 5 is pressed.

The down switch input I/F 23 includes a diode D7, resistors R8, R9, a capacitor C8, and a resistor R10 connected between the down switch 6 and the CPU 13 in a similar arrangement to that of the up switch input I/F 22. Therefore, the output (the charging voltage of the capacitor C8) of the down switch input I/F 23 to the CPU 13 is a constant voltage Vdd in the stationary state in which the down switch 6 is not pressed. If the down switch 6 is pressed and held for a predetermined period of time (for example, 0.5 msec), the charging voltage of the capacitor C8 drops from the constant voltage Vdd to the low voltage (approx. 0V). The up switch input I/F 22 and the down switch input I/F 23 correspond to the operation signal output units of the present invention.

The external reset circuit 15 is provided with a reset IC 27 in which a plurality of resistors (R19 and the like) are connected to a plurality of capacitors (C9 and the like), appropriately initializing an operation of the CPU 13 by means of the reset IC 27. In this condition, the external reset circuit 15 outputs a reset signal to a terminal !RST of the CPU 13 to initialize the operation of the CPU 13 if an output (a clear signal) from a terminal P11 of the CPU 13 is not output after an elapse of a predetermined period of time or if the voltage of the CPU 13 under operation is abnormal.

The clock generating section 14 is provided with a crystal resonator XTAL connected to the CPU 13, generating a clock signal having a constant frequency using the crystal resonator and inputting it to the CPU 13.

In FIG. 4, the circuit indicated by a reference numeral 28 is a memory processing circuit. The memory processing circuit 28 is an I/F related to a flash memory (not shown) used for the CPU 13 to read or write data.

Figure 2:
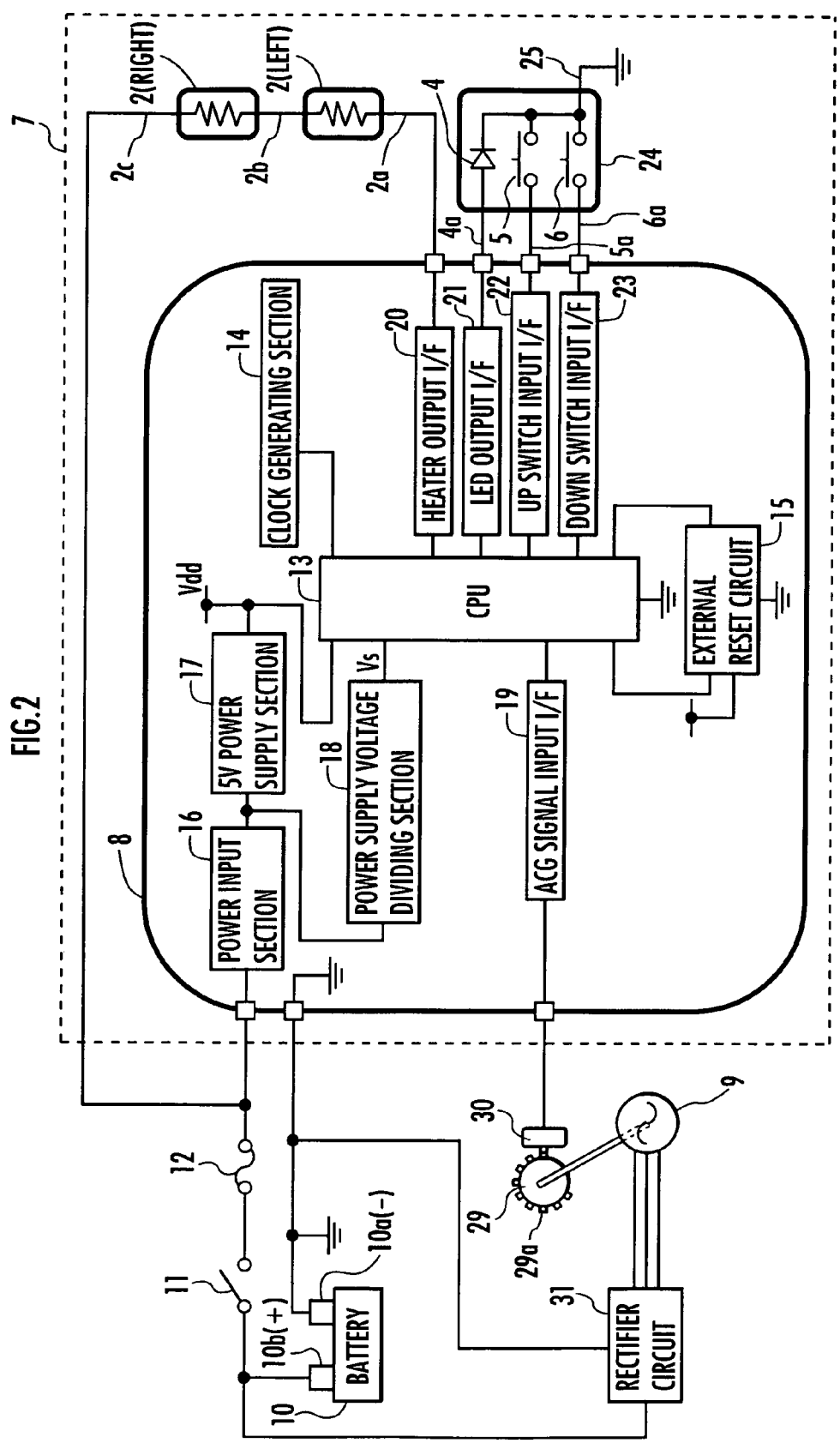
FIG. 2 is a system block diagram of the grip heater control apparatus according to the embodiment of the present invention.

In this embodiment, as shown in FIG. 2, the LED 4, the up switch 5, and the down switch 6 are packaged in a single assembly 24 (an assembly of the present invention) and connected to ground via a common ground wire (earth wire) 25 connected to the assembly 24. In this condition, the LED 4 is connected at the cathode side to the ground wire 25 to reach the ground and is connected at the anode side to the LED output I/F 21 of the controller 8 via a connecting wire (a light emitting diode connecting wire) 4a connecting between the assembly 24 and the controller 8, so that the LED output I/F 21 flows the current for turning on the LED 4 to the LED 4. The up switch 5 and the down switch 6 are connected on the side not connected to the ground wire 25 to the up switch input I/F 22 and the down switch input I/F 23 of the controller 8 via connecting wires (switch connecting wires) 5a, 6a connecting between the assembly 24 and the controller 8, respectively.

Thereby, the current flows from the up switch input I/F 22 to the up switch 5 when the up switch 5 is turned on and the current flows from the down switch input I/F 23 to the down switch 6 when the down switch 6 is turned on. Therefore, only one connecting wire is needed as an exclusive connecting wire to be connected to the assembly 24 to drive the LED 4 or as an exclusive connecting wire to be connected to the assembly 24 to detect the operation of the switches 5, 6, thereby reducing the number of connecting wires to be connected to the assembly 24 and downsizing the assembly 24.

Moreover, in this embodiment, as shown in FIG. 2, the heater 2 in the left grip 1 is connected to the controller 8 via the connecting wire 2a and connected to the heater 2 in the right grip via the connecting wire 2b. Furthermore, the heater 2 in the right grip is connected to the main switch 11 via the connecting wire 2c. The connecting wires 2a, 2b correspond to the heater connecting wires of the present invention.

Using FIG. 16 and FIG. 17, the structure of the assembly 24 and that of the flange 3 provided therewith will be described in detail below. FIG. 16 is a cross section of the flange 3 on the left grip in FIG. 1 taken on line A—A in FIG. 1, as viewed in the direction indicated by the arrow (partly cutway view), and FIG. 17 is a cross section taken on line B—B in FIG. 16, as viewed in the direction indicated by the arrow.

Figure 17:
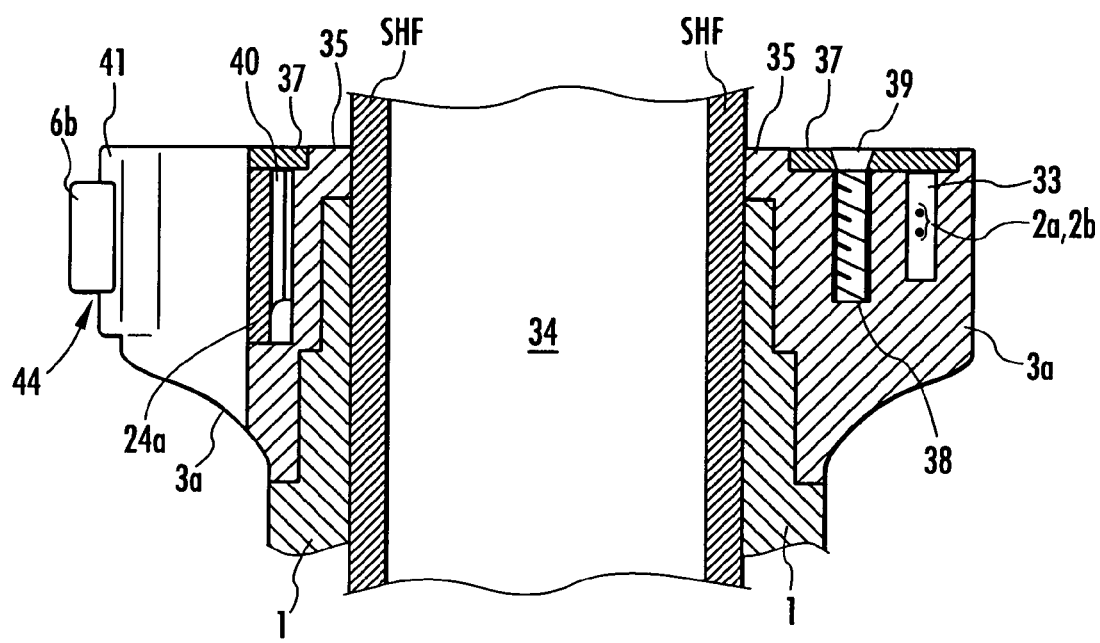
FIG. 17 is a cross section taken on line B—B in FIG. 16, as viewed in the direction indicated by the arrow.

Referring to FIG. 16 and FIG. 17, the flange 3 is formed by a casing 3a, which is made of plastic, for housing the assembly 24. The casing 3a has an assembly space 32 for housing the assembly 24 and a wiring space 33 for housing the connecting wires 2a, 2b, 4a, 5a, 6a, and the ground wire 25 inside. In FIG. 16, the connecting wires 4a, 5a, 6a, and the ground wire 25 are bundled in a single line as shown.

The casing 3a is externally fitted on the frame SHF of the steering handle SH with the frame SHF passing through a through-hole 34 formed on the central portion of the casing 3a. Around the end closer to the center of the vehicle body of the through-hole 34 of the casing 3a, there is provided a ring grip joint 35 for joining the left grip 1. The internal circumference of the portion closer to the lateral side of the vehicle body (the side from which the left grip 1 is inserted) of the through-hole 34 of the casing 3a is larger than the internal circumference of the end closer to the center of the vehicle body of the through-hole 34, and there is a clearance between the inner wall excluding the end closer to the center of the vehicle body of the through-hole 34 of the casing 3a and the frame SHF. The left grip 1 is externally fitted on the frame SHF with the end closer to the center of the vehicle body inserted into the clearance between the inner wall of the through-hole 34 of the casing 3a and the frame SHF. Moreover, the grip joint 35 is provided with six holes 36, which are disposed at intervals in the circumferential direction of the through-hole 34, with six protrusions disposed at the end closer to the center of the vehicle body of the left grip 1 fit into the six holes 36 correspondingly and welded. Thereby, the left grip 1 is joined to the casing 3a. In this condition, the connecting wires 2a, 2b from the heater 2 (hereinafter, referred to as heater connecting wires) in the left grip 1 are led into the wiring space 33 in the casing 3a.

The casing 3a has an opening at the end closer to the center of the vehicle body and has a cover 37 for covering the opening. The cover 37 is fixed with cover retaining screws 39 fitting into three threaded holes 38 disposed in the portion closer to the center of the vehicle body of the casing 3a.

The assembly space 32 of the casing 3a contains the assembly 24 in which the LED 4 and the switches 5, 6 are mounted on a printed circuit board 24a. A pair of grooves 40 are disposed so as to be opposed to each other on the upper-side inner wall of the casing 3a and the lower-side inner wall of the casing 3a in the assembly space 32. The printed circuit board 24a is put in the pair of grooves 40 with the upper and lower ends of the printed circuit board 24a supported by the grooves 40, respectively, and one side of the printed circuit board 24a abuts against the side surface closer to the lateral side of the vehicle body of the assembly space 32. In this condition, the printed circuit board 24a is put in a parallel position to the axial direction in which the frame SHF passes through the through-hole (the axial direction of the through-hole 34). Moreover, the printed circuit board 24a is connected to the light emitting diode connecting wire 4a, the switch connecting wires 5a, 6a, and the ground wire 25, with the connecting wires 4a, 5a, 6a, and the ground wire 25 led into the wiring space 33 of the casing 3a.

In a portion 41 where the assembly space 32 is formed in the periphery of the casing 3a, there are disposed a hole 42 for visually identifying the LED 4, a hole 43 for exposing (protruding) the pressing operating section 5b of the up switch 5 to the outside of the casing 3a, and a hole 44 for exposing (protruding) the pressing operating section 6b of the down switch 6 to the outside of the casing 3a, from the upper side to the lower side of the casing 3a in this order.

The LED 4 and switches 5, 6 are attached to the surface of the printed circuit board 24*a* so as to be opposed to the three holes 42, 43, and 44, respectively.

A light transmitting member 4*b* such as transparent silicon rubber is fitted into the hole 42 of the casing 3*a* and the bottom face of the member 4*b* is fixed in such a way as to abut against the top face of the LED 4. Thereby, the driver can visually identify the emitting state of the LED 4 via the member 4*b* from the outside of the casing 3*a*. Moreover, the pressing operating sections 5*b*, 6*b* of the switches 5, 6 are formed from resin such as, for example, rubber. The pressing operating sections 5*b*, 6*b* are attached in such a way as to be exposed to the outside of the casing 3*a* via the holes 43, 44 of the casing 3*a* from the side of the printed circuit board 24*a*. Therefore, the switches 5, 6 are turned on or off by the driver's pressing operation of the pressing operating sections 5*b*, 6*b* from the outside of the casing 3*a*. Thereby, the driver can operate the switches 5, 6 and visually identify the LED 4 easily.

The heater connecting wires 2*a*, 2*b*, the light emitting diode connecting wire 4*a*, the switch connecting wire 5*a*, 6*a*, and the ground wire 25 led into the wiring space 33 of the casing 3*a*, which are bundled together in the wiring space 33, pass through the rubber boot 45 provided in an outlet leading from the casing 3*a* and are led to the outside from the wiring space 33 of the casing 3*a* as the connection cable 46. This simplifies the wiring and facilitates the installation. The connection cable is sheathed with waterproof sheathing.

Returning to FIG. 4, the CPU 13 is driven by the constant voltage Vdd input from the 5V power supply section 17 and initialized by the external reset circuit 15. The CPU 13 has a function of detecting a cycle of a pulse signal input from the ACG signal input I/F 19 (a mean wave period, which is hereinafter referred to as ACG cycle) as an indication of the number of revolutions of the engine or the generator 9 by means of a program or the like written into a ROM not shown (the revolutions detecting unit of the present invention). The CPU 13 has a function of setting the upper limit electric energy to the heater 2 according to the ACG cycle (the upper limit electric energy setting unit of the present invention). Moreover, the CPU 13 has a function of setting target electric energy to the heater 2 according to input from the up switch input I/F 22 and from the down switch input I/F 23 (the target electric energy setting unit of the present invention). Moreover, the CPU 13 has a function of determining a failure of the switches 5, 6 according to an input from the up switch input I/F 22 and the down switch input I/F 23 (an operator abnormality detecting unit of the present invention). In this embodiment, the failure of the switches 5, 6 means a state where some abnormality occurs in functions of the switches 5, 6 or operations thereof.

Furthermore, the CPU 13 has a function of detecting a battery voltage by using a divided voltage Vs input from the power supply voltage dividing section 18 and determining a battery voltage drop by comparing the detected value with a predetermined voltage (the battery voltage detecting unit of the present invention). Alternatively, the battery voltage drop may be determined based on an average corrected battery voltage obtained by averaging a corrected battery voltage, which is a result of adding a voltage drop or an error in the output of the power supply voltage dividing section 18 that occurs in wiring for connecting the controller 8 to the battery 10 to the detected value of the battery voltage.

Still further, the CPU 13 determines the electric energy supplied to the heater 2 to be smaller electric energy between the upper limit electric energy to the heater 2 and the target electric energy, then outputs a command signal to the heater output I/F 20 according to the determined electric energy, and controls the ratio between the ON time and the OFF time for which the battery 10 supplies electricity to the heater 2 to adjust the electric energy to the heater 2 (adjust the electric energy to the heater 2 by means of the PWM control). Moreover, the CPU 13 outputs an OFF signal to the heater output I/F 20 (a command signal for turning off the transistor Q2 of the heater output I/F 20) in the case of a battery voltage drop and turns off the heater 2 (set the electric energy to the heater 2 to zero). These functions of adjusting the electric energy to the heater 2 correspond to the heater control unit of the present invention.

The CPU 13 has a function of outputting a command signal to the LED output I/F 21 according to a failure of the switch 5 or 6, a battery voltage drop, or the electric energy to the heater 2 to control the operation of turning on/off or blinking the LED 4 (an indication control unit of the present invention).

The following describes the operation of the system according to this embodiment. The outline of the entire operation is described, first. In the main control process of the grip heater control apparatus 7 (the main control process of the CPU 13), a battery voltage detecting process, a switch input process, a heater output process, and an indicator output process are sequentially repeated. The timings for executing these processes are determined by a timer interrupt process.

In the battery voltage detecting process, the CPU 13 detects a battery voltage by using a divided voltage Vs input from the power supply voltage dividing section 18, determines whether the detected voltage value exceeds a predetermined voltage (for example, a slightly higher voltage than the minimum voltage required to start the engine (to drive the starter motor)), and detects a condition where the battery voltage drops (the battery voltage drop condition)

In the switch input process, the CPU 13 monitors an ON input (a low-voltage signal indicating that the switch 5 or 6 is pressed) and an OFF input (a high-voltage signal indicating that the switch 5 or 6 is not pressed) input from the up switch input I/F 22 or the down switch input I/F 23 for each switch 5 or 6. Then, it is determined whether the ON input is entered from the switch 5 or 6 for a predetermined period of time or longer, whether the ON input is entered from the up switch 5 and the down switch 6 simultaneously, or the like to detect the condition of a failure of the switch 5 or 6 (switch failure condition) and the operation of the switches 5, 6 for adjusting the temperature of the heater 2.

In the heater output process, the CPU 13 outputs a command signal to the heater output I/F 20 to turn off the heater 2 if the battery voltage drop condition is detected in the battery voltage detecting process. Moreover, the level of the target electric energy to the heater 2 is set based on the operation of the switch 5 or 6 detected in the switch input process and the set level of the target electric energy is compared with the level of the upper limit electric energy to the heater 2 to determine the heater output level (actual electric energy supplied to the heater 2). The level of the upper limit electric energy is set based on the ACG cycle in an ACG input interrupt process described later. Furthermore, a heater ON_DUTY is set according to the determined heater output level. The heater ON_DUTY is an ON time for which the battery 10 supplies electricity to the heater 2 in the PWM control of the electric energy to the heater 2. The actual process of the PWM control is performed in the timer interrupt process by using the set heater ON_DUTY.

In the indicator output process, the CPU 13 sets the execution of a lighting pattern control for the voltage drop detection if the battery voltage drop condition is detected in the battery voltage detecting process (a voltage drop indication control process of the present invention). In the lighting pattern control for the voltage drop detection, the CPU 13 controls the LED 4 to be dimmed. An actual lighting pattern control for the voltage drop detection is performed in the timer interrupt process. If a switch failure condition is detected in the switch input process, the CPU 13 outputs a command signal to the LED output I/F 21 to perform the lighting pattern control for the switch failure detection (an operator abnormality indication control process of the present invention). In the lighting pattern control for the switch failure detection, the CPU 13 controls the LED 4 to be turned on or off (blink) at predetermined intervals. At this moment, it sets an LED-on time and an LED-off time in such a way that the LED-off time of the LED 4 is relatively longer than the LED-on time. In addition, it outputs a command signal to the LED output I/F 21 according to a heater output level set in the heater output process to blink the LED 4 in a blinking cycle according to the heater output level.

The timer interrupt process occurs, for example, every 100 microseconds. During execution of the timer interrupt process, the main control process is temporarily interrupted. In the timer interrupt process, a count value is set for a time counter for measuring the time based on input from the clock generating section 14. The timer interrupt process includes a determination of the execution timing for a process executed repeatedly in the main control process, a PWM control of the heater 2, a control of dimming the LED 4 at the time of detection of the battery voltage drop condition, and count value setting for measuring the ACG cycle.

The ACG input interrupt process occurs at a timing of a falling edge of a pulse signal input from the ACG signal input I/F 19 (occurs every falling edge of the pulse signal). In other words, the ACG input interrupt process occurs in synchronization with a pickup signal. The port of the CPU 13 connected to the ACG signal input I/F 19 has a higher priority than the timer interrupt process. During execution of the ACG interrupt process, both of the main control process and the timer interrupt process are temporarily interrupted.

In the ACG input interrupt process, the count value set in the timer interrupt process is read every time the interrupt process occurs, the ACG cycle is calculated, and then an ACG limiting level and a level of the upper limit electric energy to the heater 2 are determined based on the calculated ACG cycle and a predetermined threshold. The ACG limiting level indicates the number of revolutions of the generator 9 (or the engine) in stages and is set in three stages of level 0 to level 2 in this embodiment. The ACG limiting level is set to a lower level and the upper limit electric energy is set to a higher level in proportion as the number of revolutions of the generator 9 (or the engine) is higher (If the number of revolutions of the engine is higher and the ACG limiting level is zero, the upper limit electric energy level is set to level 5, the limitation of the electric energy to the heater 2 based on the upper limit electric energy is removed. If the number of revolutions of the engine is lower than the level applied when the ACG limiting level is zero and the ACG limiting level is 1, the upper limit electric energy level is set to level 2. If the number of revolutions of the engine is still lower and the ACG limiting level is 2, the upper limit electric energy level is set to level 1).

The following describes a detailed operation of the system according to this embodiment with reference to the flowcharts shown in FIG. 5 to FIG. 12. Referring to FIG. 5, FIG. 6, FIG. 7, FIG. 8, FIG. 9, FIG. 10, FIG. 11, and FIG. 12, there are shown a flowchart showing a main control process, a flowchart showing an initialization process, a flowchart showing a battery voltage detecting process, a flowchart showing a switch input process, a flowchart showing a heater output process, a flowchart showing an indicator output process, a flowchart showing a timer interrupt process, and a flowchart showing an ACG input interrupt process, respectively.

Figure 5:
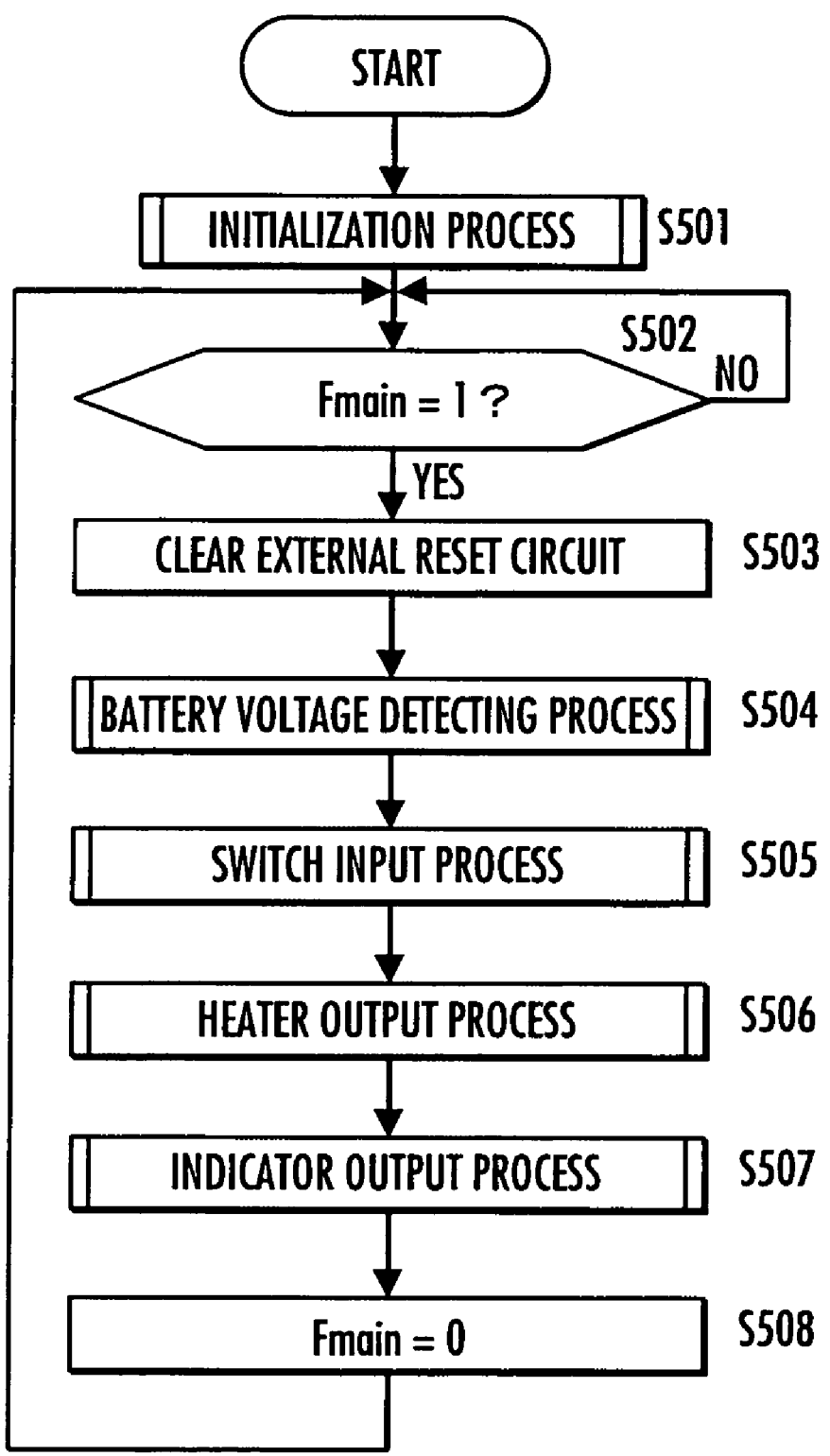
FIG. 5 is a flowchart showing a control operation of the grip heater control apparatus in FIG. 2.
Figure 6:
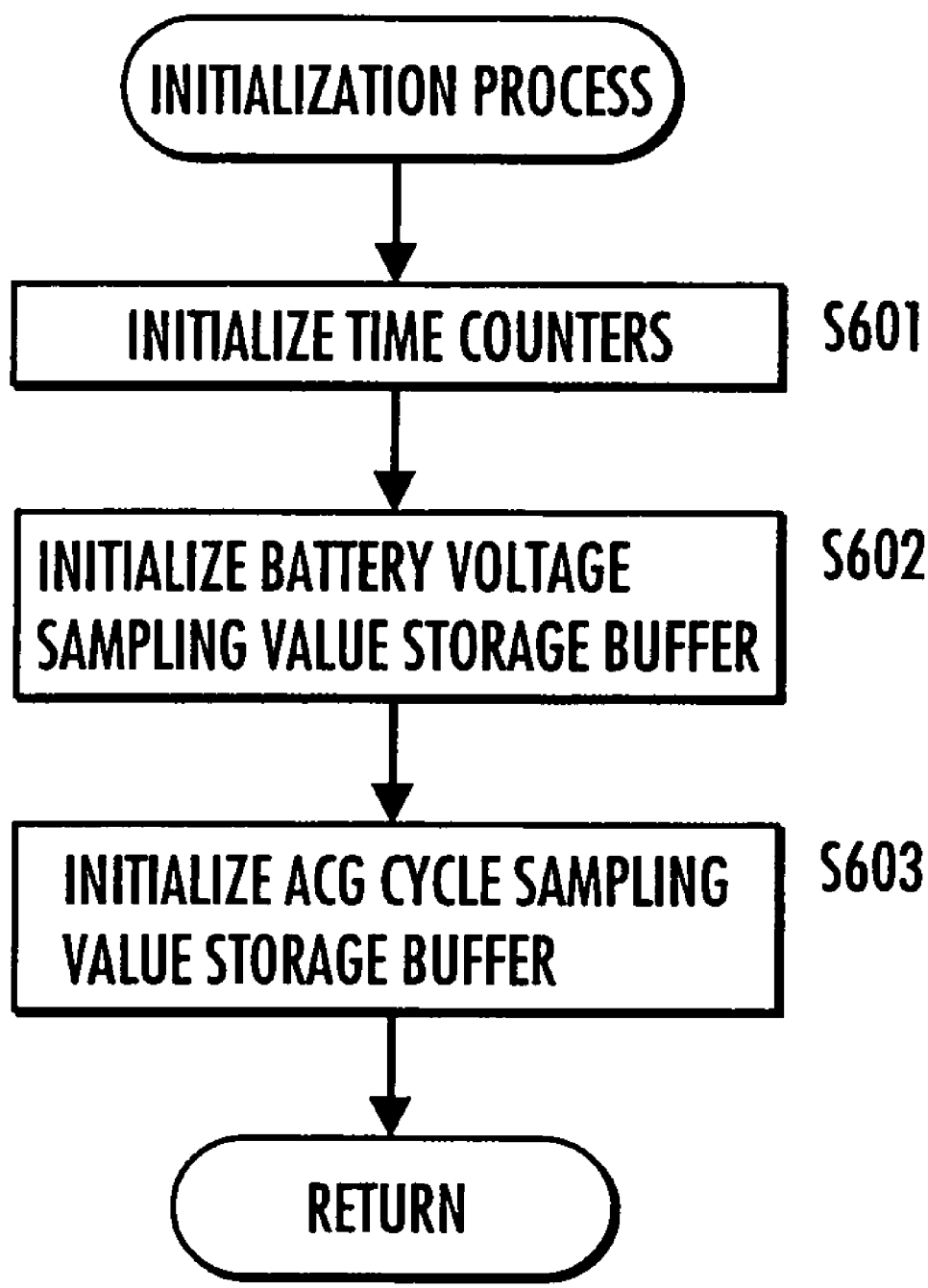
FIG. 6 is a flowchart showing a control operation of the grip heater control apparatus in FIG. 2.

Referring to FIG. 5, the initialization process is performed, first, upon starting the operation of the grip heater control apparatus 7 (when the main switch of the motorcycle is turned on and the battery 10 supplies the battery voltage to the controller 8) (step S501). The initialization process is executed as shown in FIG. 6. First, in step S601, time counters are initialized (each count value is set to 0). There are four types of time counters: a main cycle counter, a heater PWM counter, an LED cycle counter, and an ACG cycle counter. The four time counters are for use in the timer interrupt process (the timer interrupt process is described later).

Subsequently, a storage buffer for storing sampling values of battery voltages in time series order (a battery voltage sampling value storage buffer) is initialized (step S602). Then, a storage buffer for storing sampling values of ACG cycles in time series order (an ACG cycle sampling value storage buffer) is initialized (step S603). Eight pieces of data are stored in each of the battery voltage sampling value storage buffer and the ACG cycle sampling value storage buffer. The initial values of the eight pieces of data to be stored are battery voltages and ACG cycles in a state where the number of revolutions of the engine is not low (for example, 3000 rpm or higher).

Subsequently, returning to FIG. 5, it is checked whether the main control cycle elapsed flag Fmain is 1 in step S502. The main control cycle elapsed flag Fmain is set to 0 as an initial value and set to 1 every time a predetermined control cycle (for example, 10 msec) is elapsed as a result of the timer interrupt process. Step S502 is repeated until the main control cycle elapsed flag Fmain is set to 1. If the main control cycle elapsed flag Fmain is set to 1, the process proceeds to step S503. In this step, a clear signal is output to the external reset circuit 15 (clearing the external reset circuit). The control then progresses to step S504 to perform the battery voltage detecting process.

Figure 7:
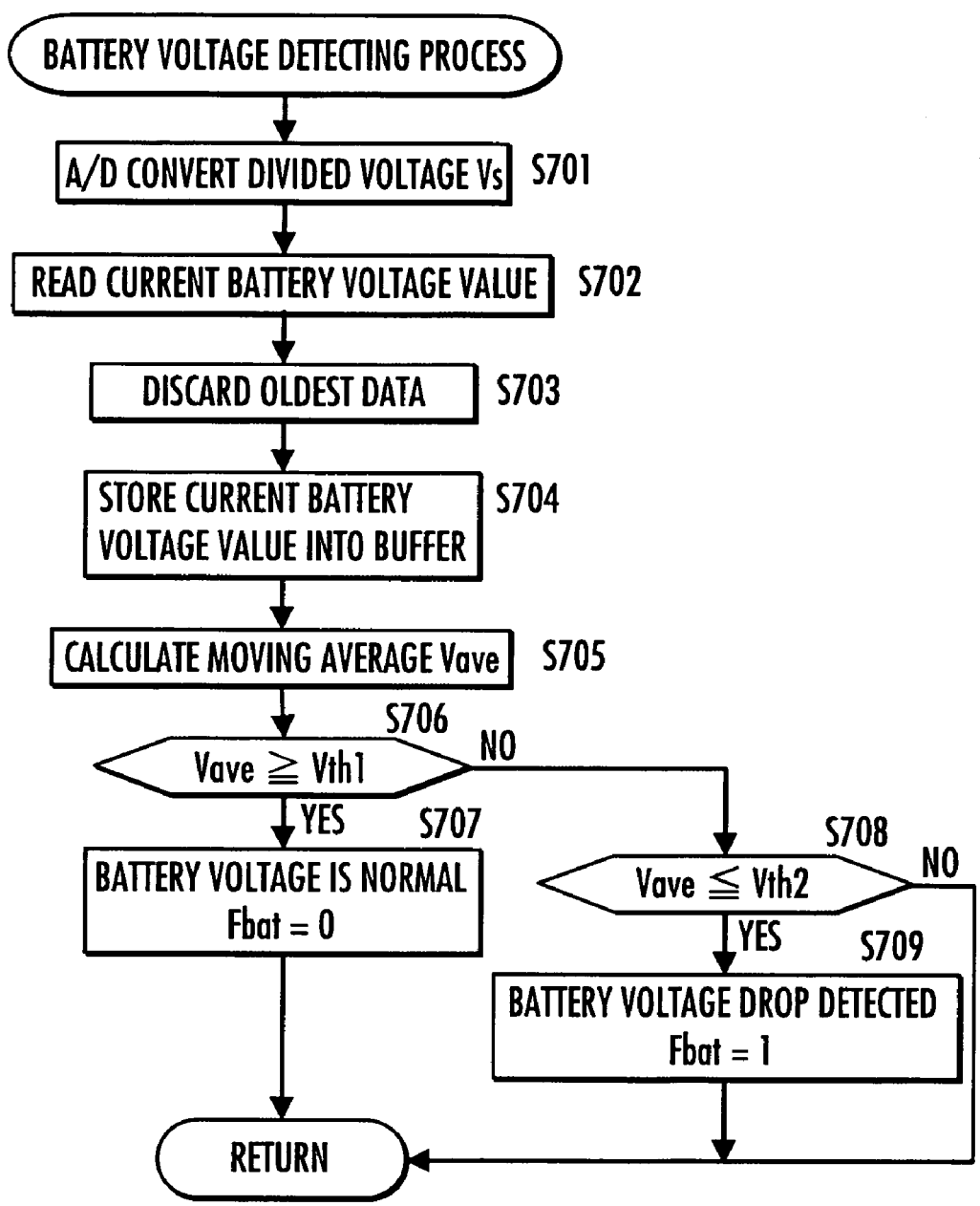
FIG. 7 is a flowchart showing a control operation of the grip heater control apparatus in FIG. 2.

The battery voltage detecting process is executed as shown in FIG. 7. First, a divided voltage Vs is input from the power supply voltage dividing section 18 and then a command is sent to perform an A/D conversion to an A/D converter circuit integrally incorporated into the CPU 13 (step S701). Thereby, the divided voltage Vs is A/D converted. Subsequently, the current converted Vs (in the current control cycle) is read as a voltage having the current battery voltage value (step S702). Alternatively, an actual battery voltage value may be calculated by multiplying Vs by a predetermined proportionality factor. Then, the oldest data in the battery voltage sampling value storage buffer is discarded (step S703) and the current battery voltage value is stored in the battery voltage sampling value storage buffer (step S704). A moving average Vave is then calculated from the stored data (step S705).

Subsequently, in step S706, the moving average Vave is compared with a battery voltage normality determination value Vth1, which is a threshold for determining that the battery voltage is normal (the battery voltage drop condition is not detected). If Vave is equal to or higher than Vth1, the battery voltage is determined to be normal and a voltage drop detection flag Fbat is set to 0 (step S707), and the process returns to step S504 shown in FIG. 5. The voltage drop detection flag Fbat is for use in indicating whether the battery voltage drops. It is set to 1 if the battery voltage drop condition is detected and is set to 0 if the battery voltage is normal.

If Vave is lower than Vth1 in step S706, the process proceeds to step S708 and Vave is compared with a battery voltage drop determining value Vth2, which is a threshold for determining that the battery voltage drops. The battery voltage drop determining value is lower than Vth1 and is set to a voltage slightly higher than the minimum voltage required to start the engine (to drive the starter motor). If Vave is equal to or lower than Vth2, the battery voltage is determined to drop and the voltage drop detection flag is set to 1 (step S709), and then the process returns to step S504 shown in FIG. 5. If Vave is higher than Vth2 in step S708, the voltage drop detection flag Fbat is not updated, and the process returns to step S504 shown in FIG. 5.

It is assumed that the battery voltage normality determination value Vth1 is 12.5V and the battery voltage drop determining value Vth2 is 12.0V, for example. By setting Vth1 and Vth2 to different values in this manner and performing processes in steps S706 to S709, hysteresis characteristics are imparted to a variation in the determination of the battery voltage (an Fbat value) relative to a fluctuation of the battery voltage. Therefore, it is possible to prevent a situation where the determination frequently changes between the normal condition and the drop condition of the battery voltage around the threshold due to the fluctuation of the battery voltage. In this regard, Vth1 and Vth2 are determined in consideration of effects of noise and the like generated by a voltage drop of a circuit or a load of driving other devices.

Figure 8:
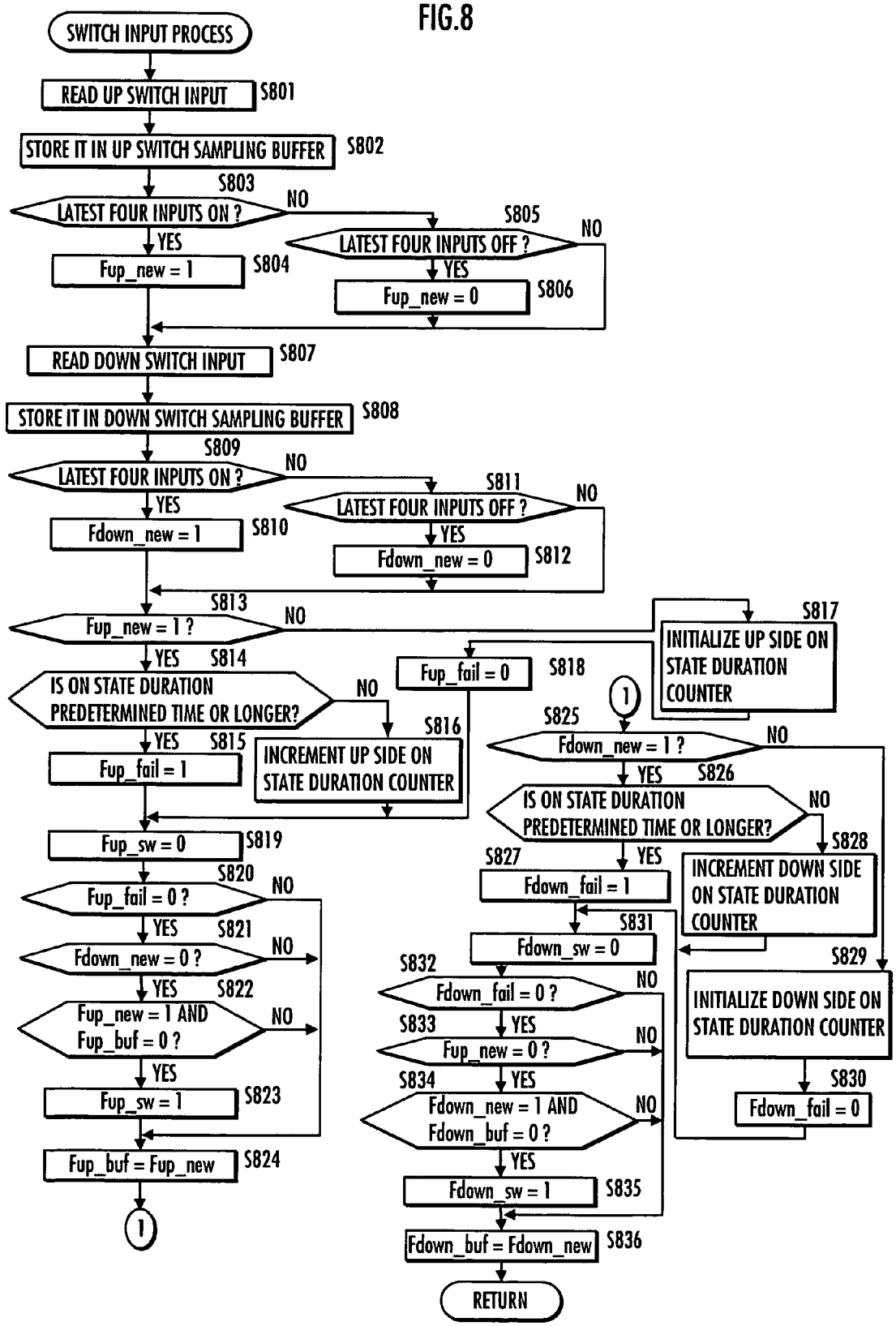
FIG. 8 is a flowchart showing a control operation of the grip heater control apparatus in FIG. 2.

Referring to FIG. 5 again, the switch input process is performed, next (step S505). The switch input process is executed as shown in FIG. 8. First, a signal input from the up switch input I/F 22 (an up switch input) is read (step S801) and the read up switch input is stored into an up switch sampling buffer (step S802). The up switch sampling buffer is for use in storing up switch inputs in time series order.

Next, in step S803, it is determined whether the latest four up switch inputs stored are ON inputs. If YES is determined in step S803, an up switch ON flag Fup_new is set to 1 (step S804) and the process proceeds to step S807. The up switch ON flag Fup_new is a flag indicating whether the up switch 5 is put in the ON state (the state in which the ON input is continuously input from the up switch input I/F 22) or in the OFF state (the state in which the OFF input is continuously input from the up switch input I/F 22). The up switch ON flag Fup_new is set to 1 if the up switch 5 is in the ON state and is set to 0 if it is in the OFF state.

If NO is determined in step S803, it is determined whether the latest four inputs stored are OFF inputs (step S805). If YES is determined, the up switch ON flag Fup_new is set to 0 (step S806) and the process proceeds to step S807. If NO is determined in step S805, the up switch ON flag Fup_new does not change and the process proceeds to step S807. Thereby, only if ON inputs have been input in succession from the up switch input I/F 22 for four periods of the control cycle, the up switch 5 is determined to be pressed (the up switch 5 is put in the ON state). Meanwhile, only if OFF inputs have been input in succession from the up switch input I/F 22 for four periods of the control cycle, the up switch 5 is determined to be not pressed (the up switch 5 is put in the OFF state).

In step S807, a signal input from the down switch input I/F 23 (a down switch input) is read and the read down switch input is stored into a down switch sampling buffer (step S808) similarly to the up switch 5. The down switch sampling buffer is for use in storing down switch inputs in time series order.

Next, in step S809, it is determined whether the latest four down switch inputs stored are ON inputs. If YES is determined in step S809, a down switch ON flag Fdown_new is set to 1 (step S810) and the process proceeds to step S813. The down switch ON flag Fdown_new indicates whether the down switch 6 is put in the ON state (the state in which the ON input is continuously input from the down switch input I/F 23) or in the OFF state (the state in which the OFF input is continuously input from the down switch input I/F 23). The down switch ON flag Fdown_new is set to 1 if the down switch 6 is in the ON state and is set to 0 if it is in the OFF state.

If NO is determined in step S809, it is determined whether the latest four inputs stored are OFF inputs (step S811). If YES is determined, the down switch ON flag Fdown_new is set to 0 (step S812) and the process proceeds to step S813. If NO is determined in step S811, the down switch ON flag Fdown_new does not change and the process proceeds to step S813. Thereby, only if ON inputs have been input in succession from the down switch input I/F 23 for four periods of the control cycle, the down switch 6 is determined to be pressed (the down switch 6 is put in the ON state). Meanwhile, only if OFF inputs have been input in succession from the down switch input I/F 23 for four periods of the control cycle, the down switch 6 is determined to be not pressed (the down switch 6 is put in the OFF state).

The next process is to determine whether the up switch 5 is out of order. First, it is checked that the up switch ON flag Fup_new is set to 1 (step S813). If the up switch ON flag Fup_new is set to 0, an up side ON state duration counter is initialized (step S817), an up switch failure detection flag Fup_fail is set to 0 (step S818), and the process proceeds to step S819. The up side ON state duration counter is for use in measuring the time period during which the ON state of the up switch 5 continues. The up switch failure detection flag Fup_fail is for use in indicating that the up switch 5 is out of order. The up switch failure detection flag Fup_fail is set to 1 if the up switch 5 is determined to be out of order and is set to 0 unless the up switch 5 is determined to be out of order.

If the up switch ON flag Fup_new is set to 1 in step S813, the duration of the ON state is equal to or longer than a predetermined time period (step S814). The predetermined time period is, for example, 10 sec. If YES is determined in step S814, the up switch 5 is determined to be out of order and Fup_fail is set to 1 (step S815). If NO is determined in step S814, the up side ON state duration counter is incremented by 1 (step S816). Thereby, abnormality of the up switch 5 can be detected when a circuit related to the up switch 5 is short-circuited or when the up switch 5 is held down unintentionally by the driver, whereby it is possible to prevent erroneous determination that the up switch 5 is pressed.

Subsequently, it is determined whether the up switch 5 is pressed (whether it is intended to change the OFF state to the ON state). This process causes the value of an up switch operation detection flag Fup_sw to be set. The up switch operation detection flag Fup_sw is for use in indicating whether the up switch 5 is pressed. The up switch operation detection flag Fup_sw is set to 1 if the up switch 5 is determined to be pressed and set to 0 unless it is determined to be pressed.

First, in step S819, the up switch operation detection flag Fup_sw is set to 0. Subsequently, in step S820, it is checked whether the up switch failure detection flag Fup_fail is set to 0. If a failure is detected in the up switch 5 (Fup_fail=1), the process proceeds to step S824. If no failure is detected in the up switch 5 (Fup_fail=0), the process proceeds to step S821 and the down switch ON flag Fdown_new is checked. If the down switch 6 is pressed (Fdown_new=1), the process proceeds to step S824. Thus, if the up switch 5 and the down switch 6 are both pressed at a time, the operations of the switches 5, 6 become invalid.

Unless the down switch 6 is pressed (Fdown_new=0) in step S821, the process proceeds to step S822 and it is confirmed that the up switch 5 is pressed in the current control cycle and that an up switch previous state flag Fup_buf is set to 0. The up switch previous state flag Fup_buf is for use in storing a value of the up switch ON flag Fup_new in the switch input process in the previous control cycle. If YES is determined in step S822, the up switch 5 is determined to be pressed and the up switch operation detection flag Fup_sw is set to 1 (step S823). Thereby, the up switch operation detection flag Fup_sw is set to 1 only if the up switch 5 is determined to be normal (the state in which Fup_fail is set to 0) and it is determined to be pressed from the condition where it is not pressed (when the up switch ON flag Fup_new is switched from 0 to 1). Next, in step S824, the up switch previous state flag Fup_buf is set to the current value of the up switch ON flag Fup_new.

Subsequently, in steps S825 to S830, it is determined whether the down switch 6 is out of order similarly to the up switch 5. First, it is checked that the down switch ON flag Fdown_new is set to 1 (step S825). If the down switch ON flag Fdown_new is set to 0, a down side ON state duration counter is initialized (step S829), a down switch failure detection flag Fdown_fail is set to 0 (step S830), and the process proceeds to step S831. The down side ON state duration counter is for use in measuring the time period during which the ON state of the down switch 6 continues. The down switch failure detection flag Fdown_fail is for use in indicating that the down switch 6 is out of order. The down switch failure detection flag Fdown_fail is set to 1 if the down switch 6 is determined to be out of order and is set to 0 unless the down switch 6 is determined to be out of order.

If the down switch ON flag Fdown_new is set to 1 in step S825, the duration of the ON state is equal to or longer than a predetermined time period (step S826). The predetermined time period is, for example, 10 sec. If YES is determined in step S827, the down switch 6 is determined to be out of order and Fdown_fail is set to 1 (step S827). If NO is determined in step S826, the down side ON state duration counter is incremented by 1 (step S828). Thereby, abnormality of the down switch 6 can be detected when a circuit related to the down switch 6 is short-circuited or when the down switch 6 is held down unintentionally by the driver, whereby it is possible to prevent erroneous determination that the down switch 6 is pressed.

Subsequently, it is determined whether the down switch 6 is pressed. This process causes the value of a down switch operation detection flag Fdown_sw to be set. The down switch operation detection flag Fdown_sw is for use in indicating whether the down switch 6 is pressed. The down switch operation detection flag Fdown_sw is set to 1 if the down switch 6 is determined to be pressed and set to 0 unless it is determined to be pressed.

First, in step S831, the down switch operation detection flag Fdown_sw is set to 0. Subsequently, in step S832, it is checked whether the down switch failure detection flag Fdown_fail is set to 0. If a failure is detected in the down switch 6 (Fdown_fail=1), the process proceeds to step S836. If no failure is detected in the down switch 6 (Fdown_fail=0), the process proceeds to step S833 and the up switch ON flag Fup_new is checked. If the up switch 5 is pressed (Fup_new=1), the process proceeds to step S836. Thus, if the up switch 5 and the down switch 6 are both pressed at a time, the operations of the switches 5, 6 become invalid.

Unless the up switch 5 is pressed (Fup_new=0) in step S833, the process proceeds to step S834 and it is confirmed that the down switch 6 is pressed and that a down switch previous state flag Fdown_buf is set to 0. The down switch previous state flag Fdown_buf is for use in storing a value of the down switch ON flag Fdown_new in the switch input process in the previous control cycle. If YES is determined in step S834, the down switch 6 is determined to be pressed and the down switch operation detection flag Fdown_sw is set to 1 (step S835). Thereby, the down switch operation detection flag Fdown_sw is set to 1 only if the down switch 6 is determined to be normal (the state in which Fdown_fail is set to 0) and then it is determined to be pressed from the condition where it is not pressed (when the down switch ON flag Fdown_new is switched from 0 to 1). Next, in step S836, the down switch previous state flag Fdown_buf is set to the current value of the down switch ON flag Fdown_new.

Figure 9:
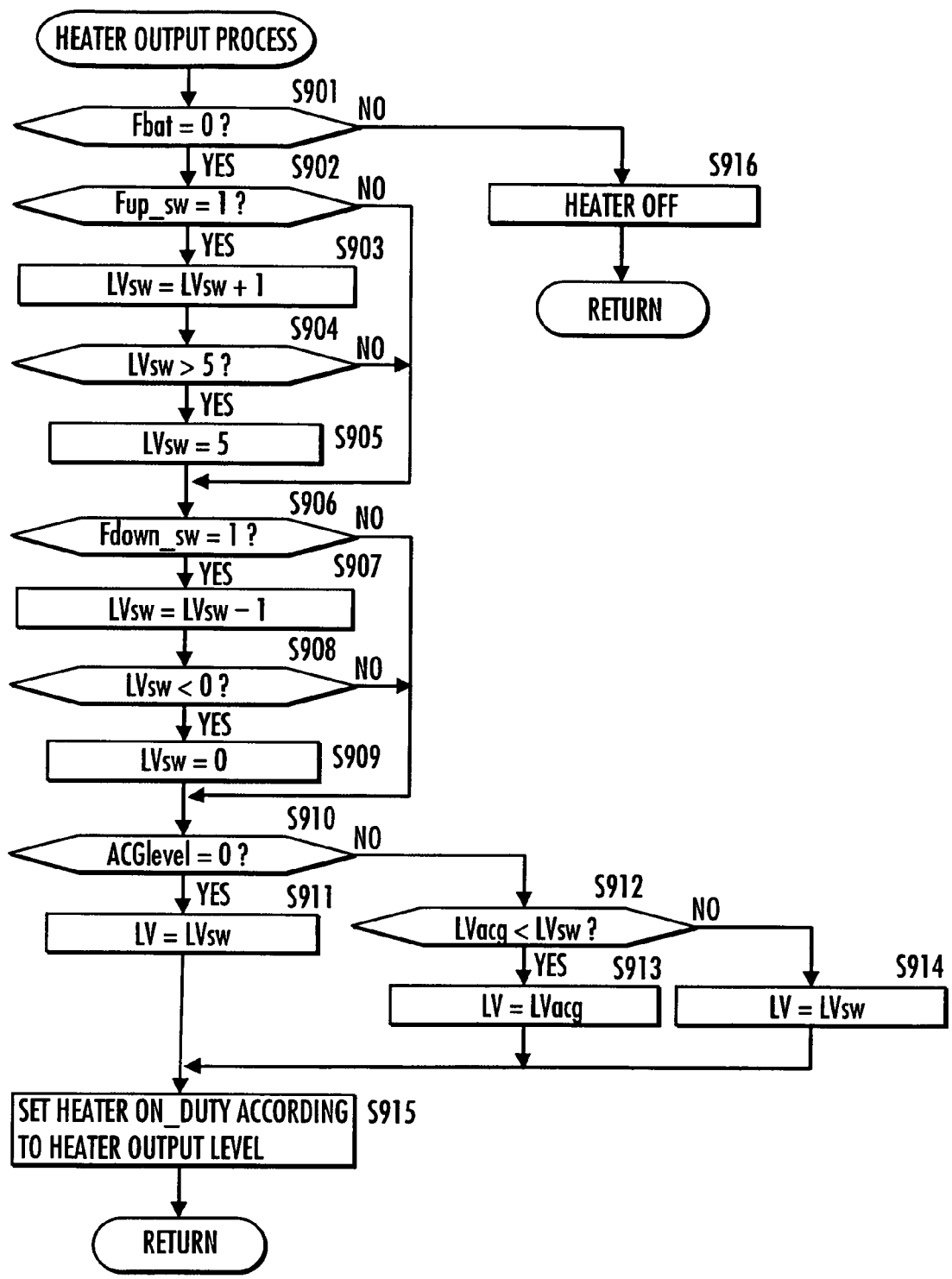
FIG. 9 is a flowchart showing a control operation of the grip heater control apparatus in FIG. 2.

Referring to FIG. 5 again, the heater output process is performed, next (step S506). The heater output process is executed as shown in FIG. 9. First, in step S901, is checked a voltage drop detection flag Fbat set in the battery voltage detecting process. If the battery voltage drop condition is detected (Fbat=1), the process proceeds to step S916, in which a command signal is output to the heater output I/F 20 to turn off the heater 2, and then the process proceeds to step S506 in FIG. 5. Thereby, if the battery voltage drops, the heater 2 is forcibly turned off so as to prevent the battery voltage from decreasing excessively.

If the battery voltage is normal (Fbat=0), a level LVsw of the target electric energy to the heater 2 is set based on the pressing of the switches 5, 6. First, LVsw is set for the pressing of the up switch 5. There is checked up switch operation detection flag Fup_sw, which has been set in the switch input process (step S902). Unless the pressing of the up switch 5 is detected (Fup_sw=0), the process proceeds to step S906. If the pressing of the up switch 5 is detected (Fup_sw=1), the process proceeds to step S903 and LVsw is incremented by 1. Subsequently, it is checked that LVsw is higher than 5 (step S904). If LVsw is equal to or lower than 5, the process proceeds to step S906. If LVsw is higher than 5, LVsw is set to 5 (step S905) and then the process proceeds to step S906.

Subsequently, LVsw is set for the pressing of the down switch 6 similarly to the pressing of the up switch 5. First, there is checked the down switch operation detection flag Fdown_sw, which has been set in the switch input process (step S906). Unless the pressing of the down switch 6 is detected (Fdown_sw=0), the process proceeds to step S910. If the pressing of the down switch 6 is detected (Fdown_sw=1), the process proceeds to step S907 and LVsw is decremented by 1. Subsequently, it is checked that LVsw is lower than 0 (step S908). If LVsw is equal to or higher than 0, the process proceeds to step S910. If LVsw is lower than 0, LVsw is set to 0 (step S909) and then the process proceeds to step S910. Through the processes to step S909 described hereinabove, LVsw is set in stages of 0 to 5 according to the pressing operation of the switches 5, 6.

Subsequently, the target electric energy level LVsw set based on the pressing operation of the switches 5, 6 is compared with the upper limit electric energy level LVacg set based on the ACG cycle and a lower level is set as a heater output level LV. First, in step S910, the ACG limiting level ACGlevel set in the ACG input interrupt process is checked (the ACG input interrupt process is described later). If the ACG level is set to 0 (if the number of revolutions of the generator 9 is sufficiently high), the process proceeds to step S911 and the heater output level LV is set to LVsw.

Unless ACG level is set to 0 (if the number of revolutions of the generator 9 is low), the process proceeds to step S912 and LVacg is compared with LVsw. If LVacg is lower than LVsw, the heater output level LV is set to LVacg (step S913). If LVacg is equal to or higher than LVsw, the heater output level LV is set to LVsw (step S914). Thereby, if LVacg (the upper limit electric energy) is equal to or higher than LVsw (the target electric energy), the heater output level LV, namely, the electric energy actually supplied to the heater 2 is controlled to the target electric energy, whereby the heater 2 can be controlled to a temperature meeting the driver's request. Moreover, if LVacg (the upper limit electric energy) is lower than LVsw (the target electric energy), the heater output level LV (the electric energy actually supplied to the heater 2) is controlled to the upper limit electric energy, thereby enabling the heater 2 to warm the grip 1 while suppressing the voltage drop of the battery 10.

Next, in step S915, the heater ON_DUTY in the PWM control of the heater 2 is set according to the set heater output level LV. The heater ON_DUTY is set to 0 if LV is 0. It is set higher in proportion as LV increases. The PWM control of the heater 2 is performed in the timer interrupt process on the basis of the heater ON_DUTY set in this process (the timer interrupt process is described later).

Figure 10:
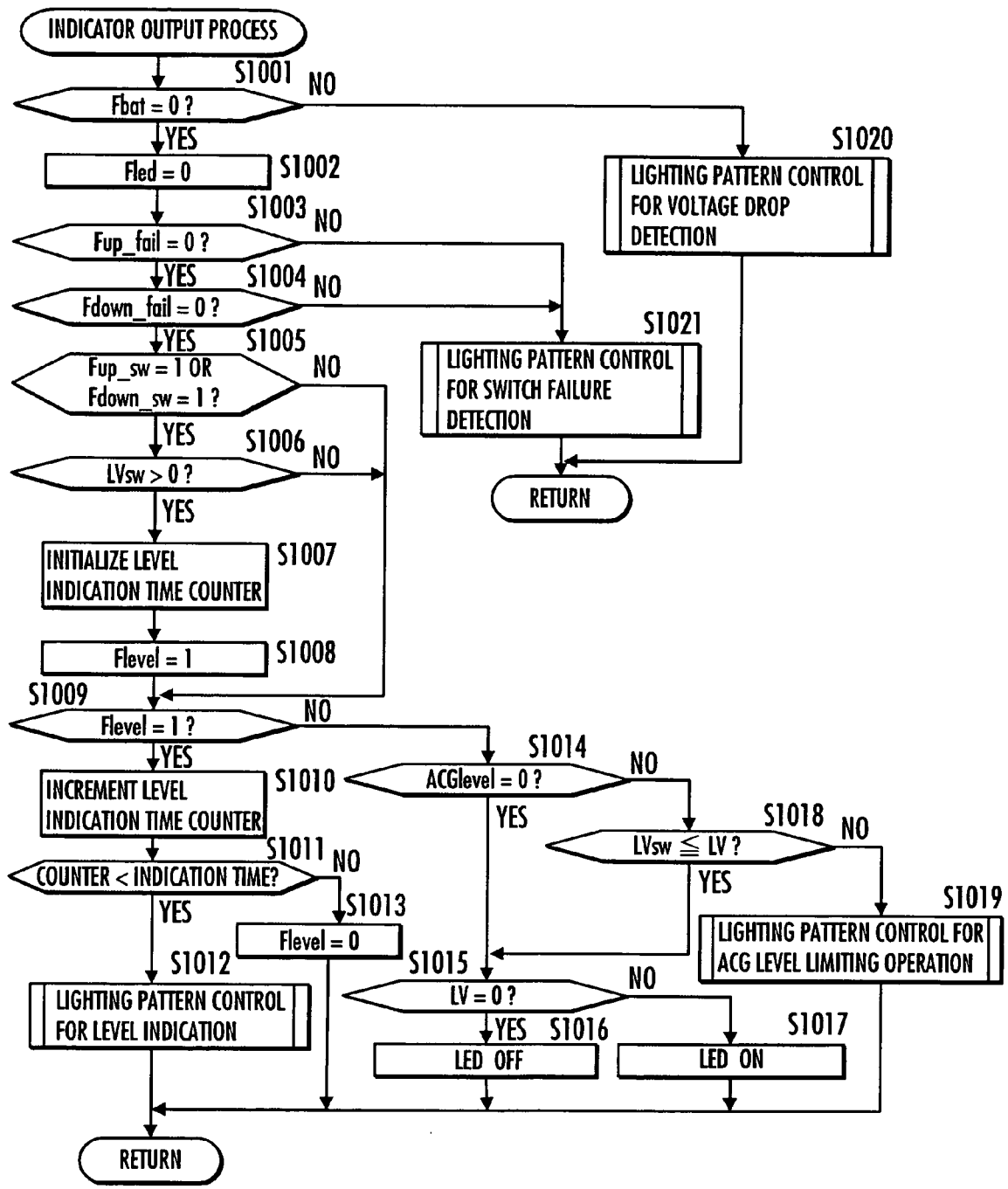
FIG. 10 is a flowchart showing a control operation of the grip heater control apparatus in FIG. 2.

Then, returning to FIG. 5, the process proceeds to the indicator output process (step S507). The indicator output process is executed as shown in FIG. 10. First, in step S1001, there is checked the voltage drop detection flag Fbat, which has been set in the battery voltage detecting process. If the battery voltage drop condition is detected (Fbat=1), the process proceeds to step S1020, the LED dimming flag Fled is set to 1 to perform the lighting pattern control for the voltage drop detection and then the process returns to step S507 in FIG. 5. The LED dimming flag Fled is for use in indicating whether to perform the lighting pattern control for the voltage drop detection. If the battery voltage drop condition is detected, the LED dimming flag Fled is set to 1. Otherwise, it is set to 0. The actual lighting patter control for the voltage drop detection is performed in the timer interrupt process (the timer interrupt process is described later).

If the battery voltage is normal (Fbat=0), the process proceeds to step S1002 and the LED dimming flag Fled is set to 0. A switch failure condition is then checked. First, is checked the up switch failure detection flag Fup_fail, which has been set in the switch input process (step S1003). If the failure of the up switch 5 is detected (Fup_fail=1), the process proceeds to step S1021. Unless the failure of the up switch 5 is detected (Fup_fail=0), the process proceeds to step S1004 to check the down switch failure detection flag Fdown_fail. If the down switch 6 is detected (Fdown_fail=1), the process proceeds to step S1021.

In step S1021, the lighting pattern control for the switch failure detection is performed and then the process returns to step S507 in FIG. 5. In this pattern control, for example, the LED 4 is controlled to light up for 0.1 sec in a 5-sec cycle. This causes a long-cycle indication different from other electrified conditions, by which the driver can recognize the switch failure clearly.

Unless the failure of the switch 6 is detected in step S1004, the process proceeds to step S1005 to check the up switch operation detection flag Fup_sw and the down switch operation detection flag Fdown_sw set in the switch input process. Unless the pressing of both the switches 5, 6 is detected (Fup_sw=0 and Fdown_sw=0), the process proceeds to step S1009. If the pressing of the switches 5, 6 is detected (Fup_sw=1 or Fdown_sw=1), the process proceeds to step S1006 to determine whether LVsw is higher than 0. If LVsw is higher than 0, a level indication time counter is initialized (step S1007), a level change indication flag Flevel is set to 1 (step S1008), and the process proceeds to step S1009. The level indication time counter is for use in measuring the time duration of the lighting pattern control for the level indication corresponding to the heater output level LV. The level change indication flag Flevel is for use in indicating whether the lighting pattern control for the level indication is to be performed, with its initial value set to 0. It is set to 1 if the heater output level LV is changed and set to 0 after the expiration of a predetermined indication time interval since it is set to 1. The predetermined indication time is, for example, 10 sec. If LVsw is equal to or lower than 0 in step S1006, the process proceeds directly to step S1009.

In step S1009, it is checked whether the level change indication flag Flevel is 1. If it is 1, the level indication time counter is incremented by 1 (step S1010). Then, the count value of the level indication time counter is compared with a predetermined indication time (step S1011). If the level indication time counter is lower than the predetermined indication time in step S1011, the process proceeds to step S1012 to perform the lighting pattern control for the level indication (an operating state indication control process of the present invention) and then the process returns to step S507 in FIG. 5. If the level indication time counter is equal to or higher than the predetermined indication time in step S1011, the level change indication flag Flevel is set to 0 (step S1013) and then the process returns to step S507.

In the lighting pattern control for the level indication in step S1012, the LED 4 is caused to blink in a predetermined cycle. This blinking is continued for a period of the predetermined indication time (for example, 10 sec) immediately after the detection of the pressing of the switches 5, 6 thereafter. This enables the driver to be easily aware of the multi-stage electrified condition of the heater 2 by means of blinking of the LED 4. In this regard, the predetermined cycle for blinking the LED 4 is set in such a way as to be shorter in proportion as the heater output level LV increases. For example, the LED 4 is caused to blink in a 2-sec cycle if LV is level 1 and to blink in a 1.25-sec cycle if LV is level 5. Thereby, the frequency of blinking the LED is higher (the cycle is shorter) in proportion as the electric energy to the heater 2 increases according to the magnitude of the change in the electric energy to the heater 2. Therefore, the driver can readily get a sense of the electric energy to the heater 2 and thus the driver can recognize the electrified condition of the heater 2 more easily.

If the level change indication flag Flevel is set to 0 in step S1009, the process proceeds to step S1014 to check whether ACG level is set to 0. If ACGlevel is set to 0 (if the number of revolutions of the generator 9 is sufficiently high), the process proceeds to step S1015. Unless ACGlevel is se to 0 (if the number of revolutions of the generator 9 is low) in step S1014, the process proceeds to step S1018 to compare LVsw with LV. If LVsw is equal to or lower than LV, the electric energy to the heater 2 is controlled to the target electric energy. If so, the process proceeds to step S1015.

In step S1015, it is checked whether the heater output level LV is set to 0. If LV is set to 0, the process proceeds to step S1016 to turn off the LED 4 (an electricity halt indication control process of the present invention) and then the process returns to step S507 in FIG. 5. Thereby, if the heater output level LV is level 0 (if the heater 2 is put in the OFF state), the LED 4 is turned off. Thus, the driver can clearly recognize that the heater 2 is stopped by the driver's operation.

Unless the heater output level LV is set to 0 in step S1015, the process proceeds to step S1017 to turn on the LED 4 (a stationary state indication control process of the present invention) and then the process returns to step S507 in FIG. 5. Thereby, after the expiration of a predetermined indication time interval (for example, 10 sec), the LED 4 continuously comes on if the heater 2 is controlled to the target electric energy set by the driver where there is no occurrence of the battery voltage drop, the switch failure, and the OFF state of the heater 2. Therefore, the driver can clearly recognize that the heater 2 is constantly supplied with the target electric energy set by the driver when the lighting pattern control for the level indication is not provided. If the battery voltage drop condition is detected after the expiration of the predetermined indication time interval, the LED 4 is dimmed by means of the lighting pattern control for the voltage drop detection. If the switch failure condition is detected, the LED 4 is turned on intermittently in a relatively slow cycle by means of the lighting pattern control for the switch failure detection.

The aforementioned lighting pattern control is described in detail with reference to FIG. 14. FIGS. 14(*a*), (*b*) are graphs each showing relations among a heater output level LV, switch operations of the switch 5, 6, and an ON/OFF state (turned on or off) of the LED 4 in the grip heater control apparatus in FIG. 2. In each of the FIGS. 14(*a*), (*b*), there are shown the heater output level LV, the ON/OFF state of the up switch 5, the ON/OFF state of the down switch 6, and the ON/OFF variation with time of the LED 4 from the upper side in this order. In the example of the operation shown in FIGS. 14(*a*), (*b*), it is assumed that neither of the battery voltage drop and the switch failure occurs.

First, referring to FIG. 14(*a*), the heater output level LV is set to level 4 and the LED 4 is caused to stay on continuously by the process of step S1017 before time ta0 in this example. At time ta0, a pressing operation of the up switch 5 is detected, by which LV is set to level 5. At this moment, the LED 4 is caused to blink in a 0.25-sec cycle, which is a cycle corresponding to the level 5, for 10 seconds from time ta0 by the process of step S1012. After a lapse of 10 seconds, the LED 4 is caused to stay on continuously by the process of step S1017. Furthermore, at time ta1 (>(ta0+10) seconds), a pressing operation of the up switch 5 is detected. Since LV is settable within the range of levels 0 to 5, LV stays at level 5 in this condition. At this moment, due to the detection of the pressing operation of the up switch 5, the LED 4 is caused to blink in a 0.25-sec cycle, which is a cycle corresponding to the level 5, for 10 seconds from time ta1 by the process of step S1012. After a lapse of 10 seconds, the LED 4 is caused to stay on continuously by the process of step S1017. Furthermore, at time ta2 (>(ta1+10) seconds), a pressing operation of the down switch 6 is detected and LV is set to level 4. At this moment, the LED 4 is caused to blink in a 0.5-sec cycle, which is a cycle corresponding to the level 4, for 10 seconds from time ta2 by the process of step S1012.

After a lapse of 10 seconds, the LED 4 is caused to stay on continuously by the process of step S1017.

Subsequently, referring to FIG. 14(*b*), the heater output level LV is set to level 2 and the LED 4 is caused to stay on continuously by the process of step S1017 before time tb0 in this example. At time tb0, a pressing operation of the up switch 5 is detected, by which LV is set to level 3. At this moment, the LED 4 is caused to blink in a 1.0-sec cycle, which is a cycle corresponding to the level 3, for a period of time from time tb0 to time tb1 by the process of step S1012. Furthermore, at time tb1 (<(tb0+10) seconds), a pressing operation of the up switch 5 is detected and LV is set to level 4. At this moment, the level indication time counter is initialized in step S1007 and the LED 4 is caused to blink in a 0.5-sec cycle, which is a cycle corresponding to the level 4, for 10 seconds from time tb1 by the process of step S1012. After a lapse of 10 seconds, the LED 4 is caused to stay on continuously by the process of step S1017. In this manner, if the switch 5, 6 is pressed multiple times during 10 seconds, the indication corresponding to the latest operation of the switch 5, 6 is immediately performed, thereby enabling the driver to clearly recognize the electric energy to the heater 2 set anew.

Subsequently, if LVsw is higher than LV in step S1018, the electric energy to the heater 2 is controlled to the upper limit electric energy. If so, the process proceeds to step S1019 to perform a lighting pattern control for the ACG level limiting operation. In the lighting pattern control for the ACG level limiting operation in step S1019, the LED 4 is caused to blink continuously in a blinking cycle corresponding to the heater output level LV during the ACG level limiting operation (when LV is controlled to LVacg (<LVsw)). Thereby, the driver can clearly recognize that the ACG level limiting operation is under execution (the electric energy actually supplied to the heater 2 is limited to the upper limit electric energy).

In the aforementioned light pattern control for the ACG level limiting operation is described below in more detail with reference to FIG. 15. FIG. 15 illustrates a graph showing relations among a heater output level LV, switch operations of the switches 5, 6, and an ON/OFF state (turned on or off) of the LED 4 under the ACG level limiting operation in the grip heater control apparatus in FIG. 2. In FIG. 15, there are shown the setting of the ACGlevel, the upper limit electric energy level LVacg, the target electric energy level LVsw, the ON state and the OFF state of the up switch 5, the ON state and the OFF state of the down switch 6, and the ON/OFF variation with time of the LED 4, from the upper side in this order. In the example of the operation shown in FIG. 15, it is assumed that neither of the battery voltage drop and the switch failure occurs.

Referring to FIG. 15, ACGlevel is set to 1, the upper limit electric energy level LVacg is set to level 2, and the target electric energy level LVsw is set to level 5 before time tc0 in this example. At this moment, the heater output level LV is limited to level 2 and the LED 4 is caused to blink continuously in an approx. 1.33-sec cycle (frequency: 0.75 Hz), which is a cycle corresponding to the level 2, by the process of step S1019.

At time tc0, a pressing operation of the down switch 6 is detected, by which LVsw is set to level 4. ACGlevel remains 1 and LVacg is maintained at level 2. At this time, due to the detection of the pressing operation of the down switch 6, the LED 4 is caused to blink in a 0.5-sec cycle, which is a cycle corresponding to the level 4 set for LVsw, for 10 seconds from time tc0 by the process of step S1012. After a lapse of 10 seconds, actual electric energy to the heater 2 is limited to level 2 and therefore the LED 4 continues to blink in an approx. 1.33-sec cycle (frequency: 0.75 Hz), which is a cycle corresponding to the level 2, by the process of step S1019.

Then, at time tc1 (>(tc0+10) seconds), a pressing operation of the up switch 5 is detected and LVsw is set to level 5. ACGlevel remains 1 and LVacg is maintained at level 2. At this moment, due to the detection of the pressing operation of the up switch 5, the LED 4 is caused to blink in a 0.25-sec cycle, which is a cycle corresponding to level 5 set for LVsw, for 10 seconds from time tc1 by the process of step S1012. After a lapse of 10 seconds, since actual electric energy to the heater 2 is limited to level 2, the LED 4 continues to blink in an approx. 1.33-sec cycle (frequency: 0.75 Hz), which is a cycle corresponding to the level 2, by the process of step S1019.

Subsequently, at time tc2 (>(tc1+10) seconds), ACGlevel is set to 0 and LVacg is set to level 5. In this condition where ACGlevel is zero (the number of revolutions of the generator 9 is sufficiently high), the limitation on the electric energy to the heater 2 is substantially removed. The pressing operation of the switch 5, 6 is not detected and LVsw is maintained at level 5. Therefore, LV is level 5 set for the target electric energy level LVsw. At this moment, the control of the LED 4 is switched to the lighting pattern control for the stationary state and the LED 4 is caused to stay on continuously by the process of step S1017.

Moreover, the process returns to step S507 in FIG. 5 to reset the main control cycle elapsed flag Fmain to 0 (step S508). Then, the process returns to step S502 to repeat the processing. Thereby, the processes of steps S503 to S508 are repeated in a predetermined control cycle.

Figure 11:
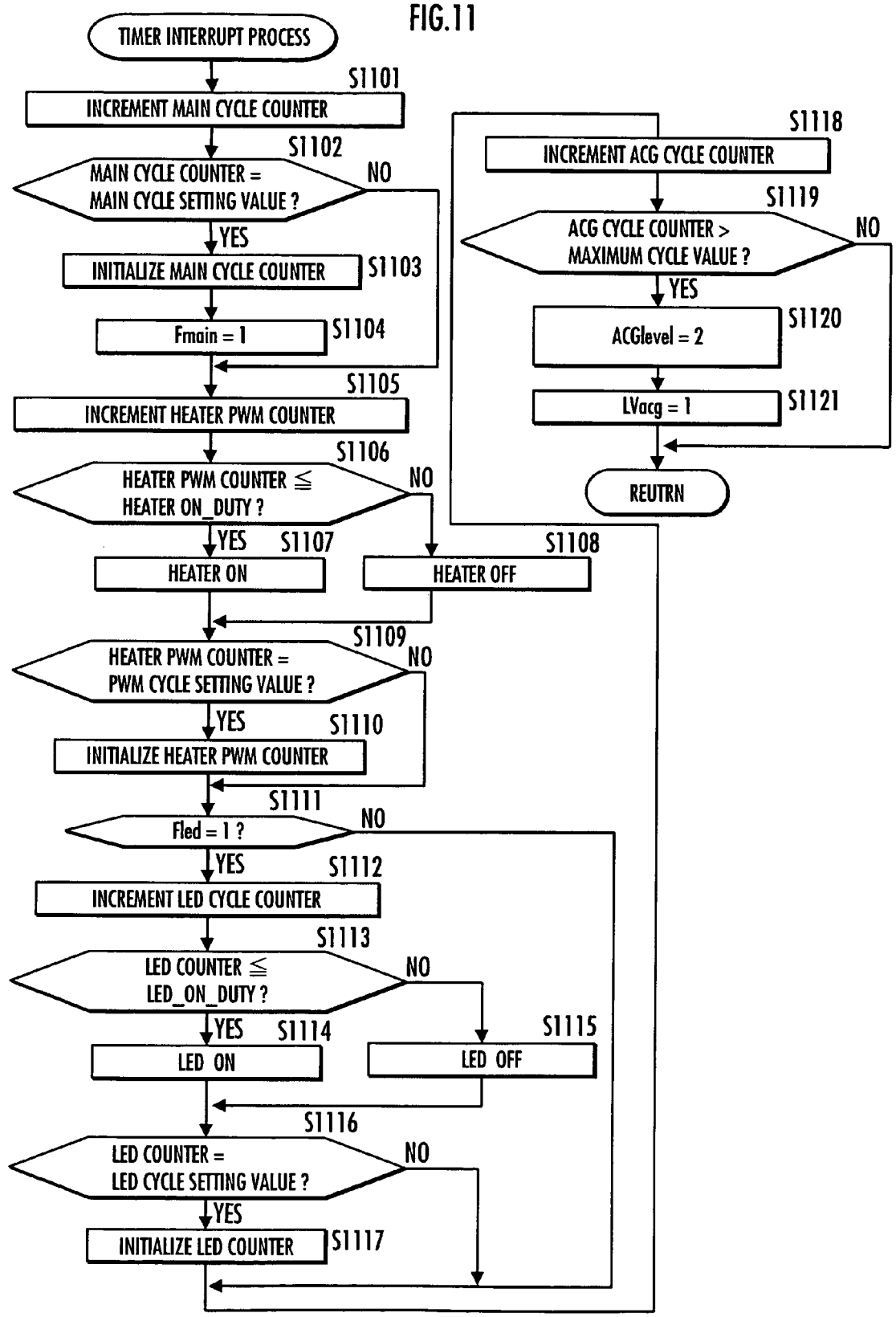
FIG. 11 is a flowchart showing a control operation of the grip heater control apparatus in FIG. 2.

The timer interrupt process is described below. Referring to FIG. 11, processing related to the main cycle counter is performed, first. The main cycle counter is for use in measuring the time for determining timings of executing the processes of steps S503 to S508 of the main control process. In step S1101, the main cycle counter is incremented by 1. Subsequently, it is checked whether the count value of the main cycle counter equals a main cycle setting value (step S1102). The main cycle setting value is the control cycle for performing the processes of steps S503 to S508 of the main control process. If YES is determined in step S1102, the main cycle counter is initialized (step S1103) and the main control cycle elapsed flag Fmain is set to 1 (step S1104). Then, the process proceeds to step S1105. If NO is determined in step S1102, the process proceeds directly to step S1105.

Subsequently, processing related to the heater PWM counter is performed. It is processing for performing the PWM control of the heater 2. In the PWM control of the heater 2, the electric energy to the heater 2 is adjusted by changing the ratio of the on time to the off time of the heater 2 during the PWM control cycle.

First, in step S1105, the heater PWM counter is incremented by 1. The heater PWM counter is for use in measuring the time for which the heater 2 is turned on and the time for which it is turned off in the PWM control of the heater 2. Then, it is checked whether the count value of the heater PWM counter is equal to or lower than the heater ON_DUTY (step S1106). If YES is determined, the heater 2 is turned on (step S1107). If NO is determined, the heater 2 is turned off (step S1108). Next, in step S1109, it is checked whether the heater PWM counter equals a PWM cycle setting value. The PWM cycle setting value is a predetermined value as a cycle for performing the PWM control of the heater 2. If YES is determined in step S1109, the heater PWM counter is initialized (step S1110) and then the process proceeds to step S1111. If NO is determined in step S1109, the process proceeds directly to step S1111.

Subsequently, processing related to the LED cycle counter is performed. It is processing for performing a dimming indication of the LED 4. The LED 4 is dimmed by controlling the ratio of the on time to the off time for energizing the LED 4 (the electric energy to the LED 4 is adjusted by the PWM control). First, in step S1111, it is checked whether the LED dimming flag Fled is 1. Unless it indicates the dimming condition (Fled=0), the process proceeds to step S1118.

If it indicates the dimming condition (Fled=1), the LED cycle counter is incremented by 1 (step S1112). The LED cycle counter is for use in measuring the time for which the LED 4 is turned on and the time for which it is turned off by means of the PWM control of the LED 4. Then, it is determined whether the count value on the LED cycle counter is equal to or lower than LED_ON_DUTY (the on time of the LED 4 within one cycle of the PWM control) (step S1113). The LED_ON_DUTY value is previously determined. If YES is determined in step S1113, an ON signal (high-voltage signal) is output to the LED output I/F 21 to turn on the LED 4 (step S1114). If NO is determined, an OFF signal (low-voltage signal) is output to the LED output I/F 21 to turn off the LED 4 (Step S1115). Next, in step S1116, it is checked whether the LED cycle counter is set at an LED cycle setting value. The LED cycle setting value is a value predetermined as a cycle for performing the PWM control of the LED 4. If YES is determined in step S1116, the LED cycle counter is initialized (step S1117) and then the process proceeds to step S1118. If NO is determined in step S1116, the process proceeds directly to step S1118.

Next, processing related to the ACG cycle counter is performed. The ACG cycle counter is for use in measuring the time for measurement of an ACG cycle indicating the number of revolutions of the generator 9 based on a pulse signal input from the ACG signal input I/F 19. First, in step S1118, the ACG cycle counter is incremented by 1. Then, it is determined whether the count value of the ACG cycle counter is higher than the maximum value of the ACG cycle (step S1119). The maximum value of the ACG cycle is predetermined to detect the state of the engine at standstill, for example. The value is sufficiently higher than the ACG cycle that can have during engine operation. If the count value of the ACG cycle counter is equal to or lower than the maximum value of the ACG cycle in step S1119, the timer interrupt process is terminated.

If the count value of the ACG cycle counter is higher than the maximum value of the ACG cycle in step S1119 (if the engine is at standstill), the ACG limiting level ACGlevel is set to 2 (step S1120), the level LVacg of the upper limit electric energy to the heater 2 is set to 1 (step S1121), and then the timer interrupt process is terminated. Thereby, if the ACG cycle value is higher than the maximum value of the ACG cycle (if the engine is at standstill), the level of the upper limit electric energy is set to level 1 (the lowest level), thereby preventing the battery voltage from excessively dropping by minimizing the electric energy supplied from the battery 10 to the heater 2 when the generator 9 is not generating power.

Figure 12:
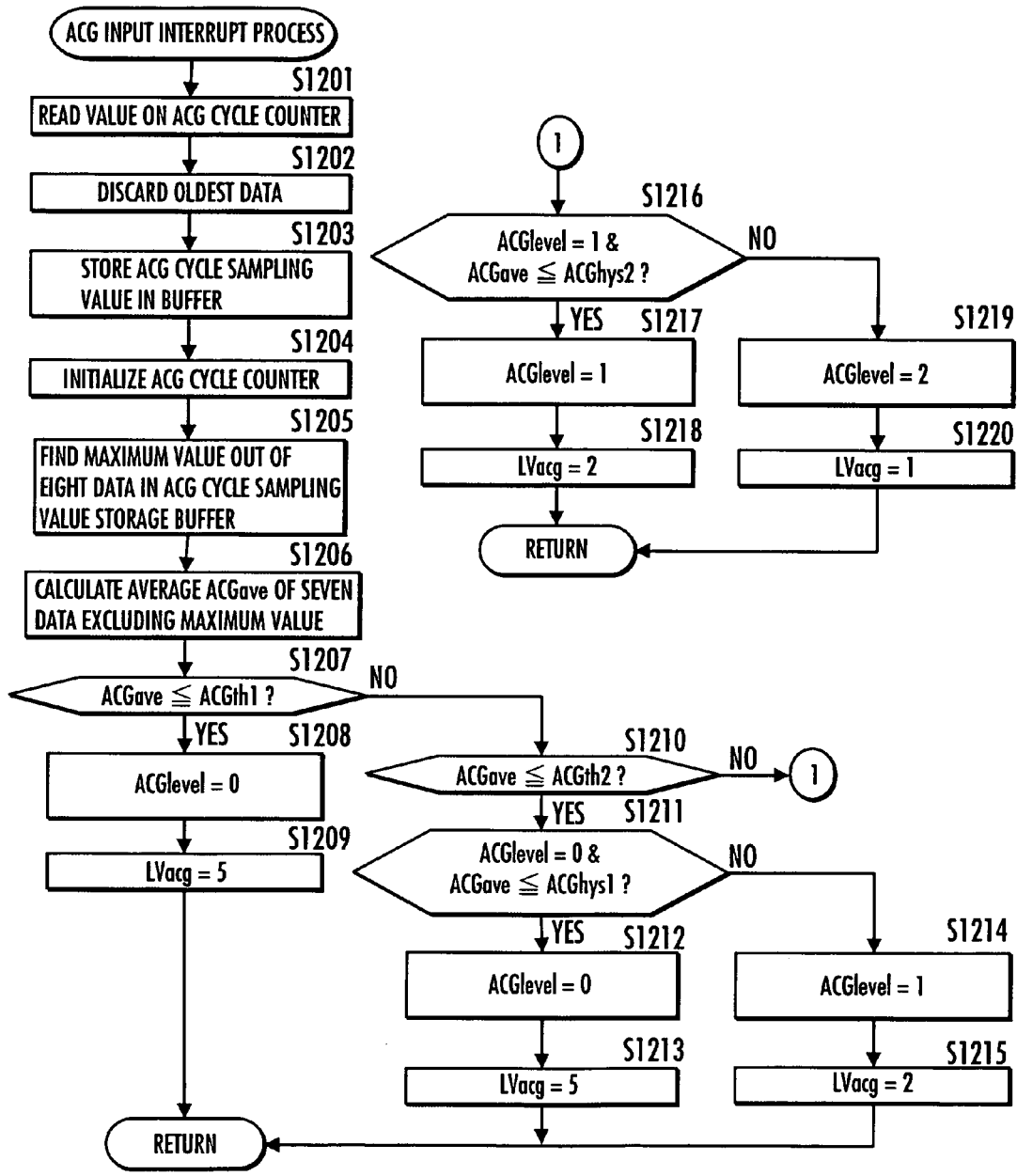
FIG. 12 is a flowchart showing a control operation of the grip heater control apparatus in FIG. 2.

Then, the following describes the ACG input interrupt process. Referring to FIG. 12, first, is read the count value on the ACG cycle counter set in the timer interrupt process (step S1201). Next, the oldest data is discarded from the ACG cycle sampling value storage buffer (step S1202) and the read count value is stored into the ACG cycle sampling value storage buffer (step S1203). Then, the ACG cycle counter is initialized (step S1204). Subsequently, the maximum value is detected out of eight pieces of data stored in the ACG cycle sampling value storage buffer (step S1205) and the ACG cycle ACGave is calculated by averaging seven pieces of data excluding the maximum value (step S1206). Thereby, even if the pickup signal partially includes a period during which there is no signal output, the ACG cycle can be calculated appropriately.

Subsequently, ACGave is compared with a threshold ACGth1 (step S1207). ACGth1 is a threshold for determining whether the ACG limiting level is level 0 or level 1 when the ACG cycle becomes shorter (when the number of revolutions of the generator 9 is increasing). If ACGave is equal to or lower than ACGth1 in step S1207, ACGlevel is set to 0 (step S1208), LVacg is set to 5 (step S1209), and then the ACG input interrupt process is terminated. For example, assuming the ACGth1 is 0.03 sec (when the number of revolutions of the engine is 200 rpm), if the ACG cycle is equal to or shorter than 0.03 sec (the number of revolutions of the engine is equal to or higher than 2000 rpm), the upper limit electric energy to the heater is set to level 5 (the maximum level) and thus the limitation on the electric energy to the heater 2 is substantially removed. Therefore, the electric energy to the heater 2 is inevitably controlled to the target electric energy, and thus the electric energy to the heater 2 is not limited when the amount of power generation of the generator 9 is sufficiently large relative to the electric energy required for the heater 2 due to the large number of revolutions. Thus, the electric energy to the heater 2 can be controlled in such a way as to bring the heater 2 to the temperature meeting the driver's request. Alternatively, if the ACG cycle is equal to or shorter than 0.03 sec, the electric energy to the heater 2 may be always controlled to the target electric energy without setting of the upper limit electric energy to the heater 2.

If ACGave is higher than ACGth1 in step S1207, the process proceeds to step S1210 to compare ACGave with a threshold value ACGth2. The ACGth2 is higher than ACGth1 and for use in determining whether the ACG limiting level is level 1 or level 2 when the ACG cycle is getting shorter. If ACGave is equal to or lower than ACGth2, the process proceeds to step S1211 to determine whether ACGlevel is set to 0 and ACGave is equal to or lower than a threshold value ACGhys1. The ACGhys1 is higher than ACGth1 and lower than ACGth2. It is for use in determining whether the ACG limiting level is level 0 or level 1 when the ACG cycle is getting longer (when the number of revolutions of the generator 9 is decreasing). ACGhys1 is assumed to be about 10% higher than ACGth1, for example. If YES is determined in step S1211, ACGlevel is set to 0 (step S1212), LVacg is set to 5 (step S1213), and then the ACG input interrupt process is terminated. If NO is determined in step S1211, ACGlevel is set to 1 (step S1214), LVacg is set to 2 (step S1215), and the ACG input interrupt process is terminated.

If ACGave is higher than ACGth2 in step S1210, the process proceeds to step S1216 to set the ACG limiting level similarly to steps S1211 to S1215. First, in step S1216, it is determined whether ACGlevel is set to 1 and ACGave is equal to or lower than a threshold value ACGhys2. The ACGhys2 is higher than ACGth2 and for use in determining whether the ACG limiting level is level 1 or level 2 when the ACG cycle becomes longer. ACGhys2 is assumed to be about 10% higher than ACGth2, for example. If YES is determined in step S1216, ACGlevel is set to 1 (step S1217), LVacg is set to 2 (step S1218), and then the ACG input interrupt process is terminated. If NO is determined in step S1216, ACGlevel is set to 2 (step S1219), LVacg is set to 1 (step S1220), and the ACG input interrupt process is terminated.

In the aforementioned process, it is assumed that ACGth2 is 0.04 sec (the number of engine revolutions: 1500 rpm), ACGhys1 is 0.033 sec (the number of engine revolutions: 1800 rpm), and ACGhys2 is 0.044 sec (the number of engine revolutions: 1350 rpm). In this condition, the upper limit electric energy to the heater 2 is set to level 2 if the ACG cycle is 0.0375 sec (the number of engine revolutions is 1600 rpm) and the level of the upper limit electric energy to the heater 2 is set to level 1 if the ACG cycle is 0.05 sec (the number of engine revolutions is 1200 rpm). This process enables setting of the upper limit electric energy appropriate and consistent with the amount of power generation of the generator 9, whereby the electric energy supplied to the heater 2 does not increase excessively relative to the amount of power generation of the generator 9 and then the electric energy supplied to the heater 2 can be controlled so as to suppress the electric power consumption of the battery. More specifically, if the number of revolutions and the amount of power generation of the generator 9 are relatively low, it is possible to control the electric energy to the heater 2 so as to be decreased. Thereby, it is possible to increase the opportunity to enable the heater 2 to warm the grip while suppressing the voltage drop of the battery 10.

Figure 13:
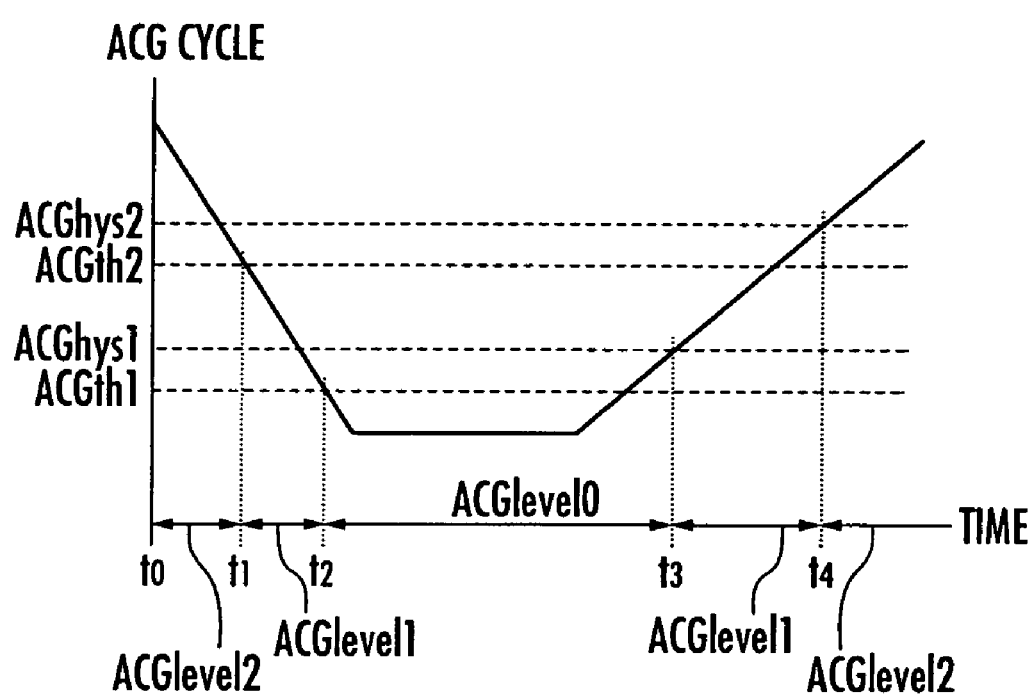
FIG. 13 is a graph showing a relation between an ACG cycle and the upper limit electric energy to the heater in the grip heater control apparatus shown in FIG. 2.

The following describes in detail a method of setting the upper limit electric energy to the heater 2 in the ACG input interrupt process with reference to FIG. 13. Referring to FIG. 13, there is shown a graph illustrating a relation between an ACG cycle indicating the number of revolutions of the engine or generator 9 and the upper limit electric energy to the heater 2, having an axis of abscissa representing time and an axis of ordinate representing ACG cycle.

If the ACG cycle varies as indicated by the solid line in FIG. 13, the ACG limiting level ACGlevel is set to 2 at time t0, first (the upper limit electric energy to the heater 2 is set to level 1). During the time period to to t1 in which the ACG cycle is getting shorter, ACGlevel remains at 2 (the upper limit electric energy to the heater 2 remains at level 1). If the ACG cycle decreases to be lower than the threshold ACGth2, ACGlevel is set to 1 (the upper limit electric energy to the heater 2 is set to level 2). If the ACG cycle further decreases to be equal to or lower than ACGth1 at time t2, ACGlevel is set to 0 (the upper limit electric energy to the heater 2 is set to level 5 (the maximum level)), whereby the limitation on the electric energy to the heater 2 is substantially removed. The electric energy to the heater 2 continues to be released from the limitation during the time period from t2 to t3. When the ACG cycle increases thereafter to be equal to or higher than ACGhys1 at time t3, ACGlevel is set to 1 (the upper limit electric energy to the heater 2 is set to level 2). When the ACG cycle increases to be equal to or higher than ACGhys2 at time t4, ACGlevel is set to 2 (the upper limit electric energy to the heater 2 is set to level 1). By determining the level LVacg of the upper limit electric energy to the heater 2, the change in the upper limit electric energy relative to the change in the number of engine revolutions can be provided with hysteresis characteristics, thereby preventing an unstable operation, which may be caused by changes in the upper limit electric energy frequently repeated due to the variation in the number of revolutions of the engine.

While the vehicle is a motorcycle in this embodiment, it may be a snowmobile, a wet bike, or the like.

What is claimed is:

1. A grip heater control apparatus, comprising:
a heater for generating heat by means of electric power supplied from a battery, the heater being provided in a grip of a steering handle of a vehicle having the battery;
a heater temperature operator operated by a driver for adjusting a temperature of the heater;
an operation signal output unit for outputting a signal corresponding to an operation of the heater temperature operator;
a target electric energy setting unit for setting target electric energy to the heater according to the output of the operation signal output unit;
a heater control unit for controlling the electric energy supplied to the heater from the battery to the target electric energy under at least a predetermined condition;
an indicator for indicating at least an electrified condition of the heater; and
an indication control unit for controlling an indication of the indicator,
wherein the indicator is a single light emitter provided along with the heater temperature operator at an end of the grip and wherein the indication control unit includes a unit for executing an operating state indication control process including a process of variably setting a first predetermined cycle, which is a blinking cycle of the light emitter, according to the target electric energy set by the target electric energy setting unit in response to an operation of the heater temperature operator when operated and a process of blinking the light emitter in the set first predetermined cycle.

2. The grip heater control apparatus according to claim 1, wherein the indication control unit executes a process of blinking the light emitter in the set first predetermined cycle for a predetermined period of time immediately after the heater temperature operator is operated in the operating state indication control process.

3. The grip heater control apparatus according to claim 2, wherein the indication control unit sets the first predetermined cycle so as to be shorter in proportion as the target electric energy increases.

4. The grip heater control apparatus according to claim 1, wherein, if the heater temperature operator is operated again during the predetermined period of time immediately after the heater temperature operator is operated, the indication control unit aborts the operating state indication control process before the second operation and performs the operating state indication control process anew.

5. The grip heater control apparatus according to claim 2, wherein the indication control unit includes a unit for executing a stationary state indication control process of causing the light emitter to stay on continuously if the heater control unit is controlling the electric energy supplied to the heater to the target electric energy in a period other than the predetermined period of time.

6. The grip heater control apparatus according to claim 5, wherein the vehicle has an engine as a propulsive source and a generator for generating electric power interlocking with the rotation of the engine and charging the battery, wherein the grip heater control apparatus further comprises a revolutions detecting unit for detecting the number of revolutions of the engine or the generator and an upper limit electric energy setting unit for setting upper limit electric energy to the heater according to the detected number of revolutions, wherein the heater control unit controls the electric energy supplied to the heater to a lower level of the target electric energy and the upper limit electric energy, and wherein the unit for executing the stationary state indication control process blinks the light emitter in a second predetermined cycle if the heater control unit is controlling the electric energy supplied to the heater to the upper limit electric energy in the period other than the predetermined period of time.

7. The grip heater control apparatus according to claim 6, wherein there are plural types of values for the upper limit electric energy set by the upper limit electric energy setting unit according to the detected number of revolutions and wherein the indication control unit sets the second predetermined cycle variably according to the value of the upper limit electric energy.

8. The grip heater control apparatus according to claim 5, wherein the target electric energy, set by the target electric energy setting unit, includes zero, wherein the heater control unit includes a unit for halting electricity to the heater if the target electric energy is zero, and wherein the indication control unit includes a unit for inhibiting the operating state indication control process and the stationary state indication control process and executing an electricity halt indication control process of causing the light emitter to stay off continuously, if the electricity to the heater is halted by the heater control unit.

9. The grip heater control apparatus according to claim 6, wherein the target electric energy, set by the target electric energy setting unit, includes zero, wherein the heater control unit includes a unit for halting electricity to the heater if the target electric energy is zero, and wherein the indication control unit includes a unit for inhibiting the operating state indication control process and the stationary state indication control process and executing an electricity halt indication control process of causing the light emitter to stay off continuously, if the electricity to the heater is halted by the heater control unit.

10. The grip heater control apparatus according to claim 7, wherein the target electric energy, set by the target electric energy setting unit, includes zero, wherein the heater control unit includes a unit for halting electricity to the heater if the target electric energy is zero, and wherein the indication control unit includes a unit for inhibiting the operating state indication control process and the stationary state indication control process and executing an electricity halt indication control process of causing the light emitter to stay off continuously, if the electricity to the heater is halted by the heater control unit.

11. The grip heater control apparatus according to claim 5, further comprising an operator abnormality detecting unit for detecting an abnormality of the heater temperature operator, wherein the indication control unit includes a unit for inhibiting the operating state indication control process and the stationary state indication control process and executing an operator abnormality indication control process of blinking the light emitter in a third predetermined cycle, which is different from the first predetermined cycle, if the abnormality of the heater temperature operator is detected.

12. The grip heater control apparatus according to claim 6, further comprising an operator abnormality detecting unit for detecting an abnormality of the heater temperature operator, wherein the indication control unit includes a unit for inhibiting the operating state indication control process and the stationary state indication control process and executing an operator abnormality indication control process of blinking the light emitter in a third predetermined cycle, which is different from either of the first and second predetermined cycles, if the abnormality of the heater temperature operator is detected.

13. The grip heater control apparatus according to claim 7, further comprising an operator abnormality detecting unit for detecting an abnormality of the heater temperature operator, wherein the indication control unit includes a unit for inhibiting the operating state indication control process and the stationary state indication control process and executing an operator abnormality indication control process of blinking the light emitter in a third predetermined cycle, which is different from either of the first and second predetermined cycles, if the abnormality of the heater temperature operator is detected.

14. The grip heater control apparatus according to claim 5, further comprising a battery voltage detecting unit for detecting a voltage of the battery, wherein, if the detected battery voltage is below a predetermined voltage, the indication control unit includes a unit for inhibiting the operating state indication control process and the stationary state indication control process and executing a voltage drop indication control process of causing the light emitter to stay on continuously with the light emitter dimmer than when it is on in the stationary state indication control process.

15. The grip heater control apparatus according to claim 1, wherein the heater temperature operator includes at least one on-off switch.

16. The grip heater control apparatus according to claim 15, further comprising a light emitting diode as the light emitter and a control circuit having at least functions of the operation signal output unit, the target electric energy setting unit, the heater control unit, and the indication control unit, wherein the on-off switch and the light emitting diode are packaged in a single assembly, which is separate from the control circuit, and placed at an end of the grip, wherein the control circuit is mounted on the vehicle in a place other than the steering handle of the vehicle, wherein one contact of the on-off switch and the cathode side of the light emitting diode are grounded via a common ground wire connected to the assembly, wherein the other end of the on-off switch is connected to the control circuit via a switch connecting wire for connecting between the control circuit and the assembly to flow current from the control circuit to the on-off switch when turning on the on-off switch, and wherein the anode side of the light emitting diode is connected to the control circuit via a light emitting diode connecting wire for connecting between the control circuit and the assembly to flow current from the control circuit to the light emitting diode when turning on the light emitting diode.

17. The grip heater control apparatus according to claim 16, wherein the assembly includes the on-off switch and the light emitting diode mounted on a printed circuit board with the switch connecting wire, the light emitting diode connecting wire, and the ground wire connected thereto and wherein the printed circuit board is housed in a casing fixed at the end of the grip with being externally fitted on a base of the steering handle.

18. The grip heater control apparatus according to claim 17, wherein the on-off switch is of the pressing operation type, wherein a pressing operating section of the switch is provided in such a manner as to be exposed to the outside of the casing, wherein the light emitting diode is provided inside the casing, and wherein the casing is equipped with a light transmitting member for guiding a light emitted from the light emitting diode to the outside of the casing in a location where the light transmitting member faces the light emitting diode.

19. The grip heater control apparatus according to claim 17, wherein the grip is provided at two places on the left hand side and on the right hand side on the steering handle with the heater incorporated in each grip, wherein the on-off switch is operated to adjust a temperature of the heater in the grip provided at two places, wherein the casing is provided at the end closer to the center of the vehicle of one of the grips at two places, wherein a heater connecting wire connected to the heater for a supply of electricity to the heater of the grip, which is one of the grips, is led into the inside of the casing, and wherein the heater connecting wire is bundled with the switch connecting wire, the light emitting diode connecting wire, and the ground wire connected to the printed circuit board in a single connection cable and is led out from the inside of the casing to the outside thereof.

20. The grip heater control apparatus according to claim 18, wherein the grip is provided at two places on the left hand side and on the right hand side on the steering handle with the heater incorporated in each grip, wherein the on-off switch is operated to adjust a temperature of the heater in the grip provided at two places, wherein the casing is provided at the end closer to the center of the vehicle of one of the grips at two places, wherein a heater connecting wire connected to the heater for a supply of electricity to the heater of the grip, which is one of the grips, is led into the inside of the casing, and wherein the heater connecting wire is bundled with the switch connecting wire, the light emitting diode connecting wire, and the ground wire connected to the printed circuit board in a single connection cable and is led out from the inside of the casing to the outside thereof.

* * * * *